(12) United States Patent
Natsumeda

(10) Patent No.: US 11,378,944 B2
(45) Date of Patent: Jul. 5, 2022

(54) SYSTEM ANALYSIS METHOD, SYSTEM ANALYSIS APPARATUS, AND PROGRAM

(71) Applicant: NEC Corporation, Tokyo (JP)

(72) Inventor: Masanao Natsumeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 98 days.

(21) Appl. No.: 16/651,621

(22) PCT Filed: Oct. 10, 2017

(86) PCT No.: PCT/JP2017/036622
§ 371 (c)(1),
(2) Date: Mar. 27, 2020

(87) PCT Pub. No.: WO2019/073512
PCT Pub. Date: Apr. 18, 2019

(65) Prior Publication Data
US 2020/0310401 A1    Oct. 1, 2020

(51) Int. Cl.
*G05B 23/02* (2006.01)
(52) U.S. Cl.
CPC .................. *G05B 23/024* (2013.01)
(58) Field of Classification Search
CPC .............. G05B 23/024; G05B 23/0281; G05B 23/0224; G01D 18/00
See application file for complete search history.

(56) References Cited

U.S. PATENT DOCUMENTS

| 6,415,282 B1 | 7/2002 | Mukherjea et al. |
| 2012/0278663 A1 | 11/2012 | Hasegawa |
| 2012/0290879 A1 | 11/2012 | Shibuya et al. |
| 2013/0132000 A1 | 5/2013 | Tamaki |
| 2016/0217022 A1* | 7/2016 | Velipasaoglu ...... G06F 11/0751 |

(Continued)

FOREIGN PATENT DOCUMENTS

| JP | H11-328228 A | 11/1999 |
| JP | 2009-265707 A | 11/2009 |
| JP | 2011-243118 A | 12/2011 |

(Continued)

OTHER PUBLICATIONS

International Search Report for PCT Application No. PCT/JP2017/036622, dated Jan. 16, 2018.

*Primary Examiner* — Mischita L Henson
(74) *Attorney, Agent, or Firm* — Sughrue Mion, PLLC

(57) ABSTRACT

A system analysis method includes: acquiring history information indicating, based on sensor values outputted by sensors, whether one of sensor values outputted by respective sensors indicates abnormality and/or whether individual relationship between sensor values outputted by different sensors indicates abnormality in time-series manner; estimating a change point group of change points, each indicating a time point system state has changed, based on history information; estimating relevance levels, each indicating relevance to the system state between two arbitrary time points included in the change point group; generating groups of change point groups by classifying the change point group into a plurality of groups based on the history information and the relevance levels; and generating and outputting output information, as information relating abnormality per group of the change point groups.

20 Claims, 16 Drawing Sheets

(56) References Cited

U.S. PATENT DOCUMENTS

2019/0064789 A1    2/2019  Natsumeda
2020/0025690 A1 *  1/2020  Koshihara ............ G06K 9/6212

FOREIGN PATENT DOCUMENTS

| JP | 5267684 B2 | 8/2013 | |
|----|---|---|---|
| JP | 2014-096050 A | 5/2014 | |
| JP | 2014-115714 A | 6/2014 | |
| JP | 2015-099519 A | 5/2015 | |
| JP | 2015-172945 A | 10/2015 | |
| JP | 2016-024786 A | 2/2016 | |
| WO | WO-2010095314 A1 * | 8/2010 | ........... G05B 23/024 |
| WO | 2017/150286 A1 | 9/2017 | |

* cited by examiner

FIG. 5

| GROUP NAME | TIME |
|---|---|
| GROUP 1 | 2016/9/20 13:00-14:00 |
| GROUP 2 | 2016/9/20 15:00-16:00 |
| ..... | ..... |

FIG. 7
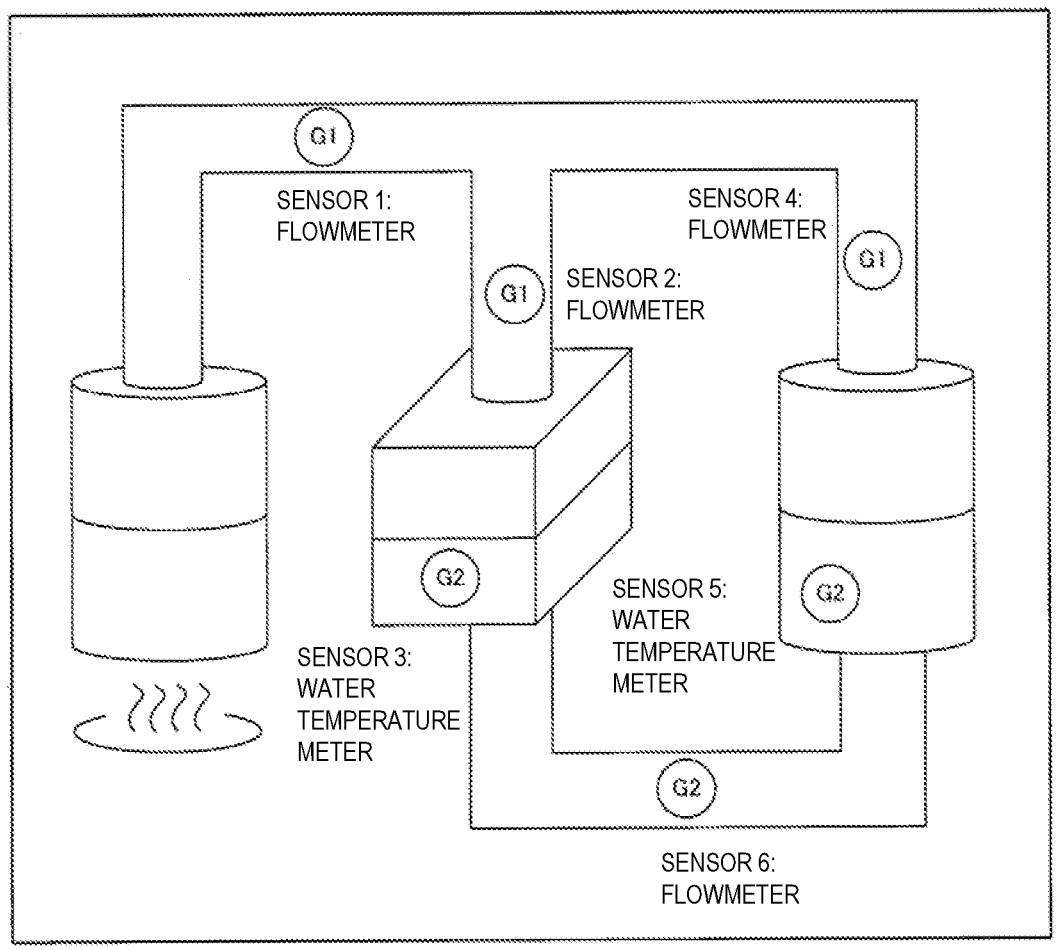
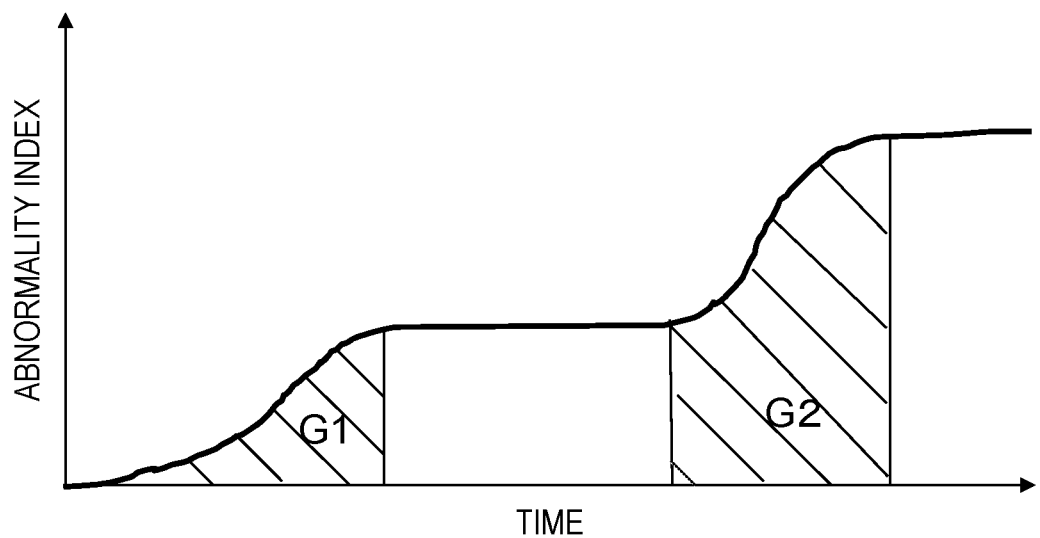

FIG. 8

| TIME | SIMILAR PAST PROBLEM |
|---|---|
| 2016/9/20 13:00—14:00 | PARTIAL CLOSURE OF DISTILLATION COLUMN |
| 2016/9/20 15:00—16:00 | MALFUNCTION OF FLOWMETER |
| ..... | ..... |

SYSTEM ANALYSIS METHOD, SYSTEM ANALYSIS APPARATUS, AND PROGRAM

This application is a National Stage Entry of PCT/JP2017/036622 filed on Oct. 10, 2017, the contents of all of which are incorporated herein by reference, in their entirety.

FIELD

The present invention relates to a system analysis method, a system analysis apparatus, and a program. In particular, it relates to a system analysis method, a system analysis apparatus, and a program for analyzing a system state.

BACKGROUND

In recent years, system analysis apparatuses that analyze system states based on sensor data obtained from system components have been used. Such a system analysis apparatus performs analysis processing to operate a system safely and efficiently. In one example of the analysis processing, multivariate analysis is performed on sensor data to detect whether there is an abnormality in the system. If the system analysis apparatus detects an abnormality in the system by performing such analysis processing, the system analysis apparatus notifies the operator and the system of the occurrence of the abnormality. As a result, since the abnormality or a sign of the abnormality is detected at an early stage, an initial response can be performed quickly, and damage can be minimized.

For example, the system on which the analysis processing is performed is a group or a mechanism constituted by elements that affect each other, such as an information and communication technology (ICT) system, a chemical plant, an electric power plant, or power facilities.

Among these system analysis apparatuses, there is a system analysis apparatus that provides, when the system analysis apparatus detects an abnormality of a system, information useful to determine the cause of the abnormality. A sensor name relating to the abnormality is one example of the information to be provided. PTLs 1 to 3 disclose techniques that notify the operator and the system of such abnormality-related sensor names.

Specifically, when a system analysis apparatus detects an abnormality, a process monitoring diagnostic apparatus disclosed in PTL 1 provides a sensor name indicating a high abnormality level as a sensor name relating to the abnormality.

In addition, a time-series data processing apparatus disclosed in PTL 2 estimates the propagation sequence of an abnormality from a certain period of time-series data, rearranges sensor names relating to the abnormality in the estimated propagation sequence of the abnormality, and provides the sensor names.

In addition, PTL 3 discloses a technique of collecting and grouping sensor data items whose behaviors are highly related to each other from a plurality of sensor data items and establishing link models, each of which represents an interrelationship between data items in a group, and link modes, each of which represents an interrelationship between groups.

In addition, PTL 4 discloses a technique relating to an operation management apparatus, etc., for monitoring the operating status of a system. An apparatus disclosed in PTL 4 acquires measured values of a plurality of performance indexes (metrics) from a plurality of monitoring target apparatuses and generates an individual correlation model between two different metrics. The apparatus disclosed in PTL 4 compares an estimated value relating to a metric, the value having been calculated by using a correlation model, with an actually measured value of the corresponding metric and detects an abnormality item based on the comparison result. The apparatus disclosed in PTL 4 calculates, per monitoring target apparatus, an abnormality score by using the total number of combinations of two metrics and the number of abnormality items detected and determines a metric(s) having a high abnormality score(s) as an abnormality generation source(s).

PTL 1: Japanese Patent Kokai Publication No. JP2014-096050A
PTL 2: Japanese Patent Kokai Publication No. JP2014-115714A
PTL 3: Japanese Patent Kokai Publication No. JP2011-243118A
PTL 4: Japanese Patent No. 5267684

SUMMARY

All the contents disclosed by PTLs 1 to 4 are incorporated herein by reference thereto. The following analysis has been made by the present inventor.

When the apparatuses disclosed in PTLs 1 to 4 detect events including a plurality of kinds of abnormalities and a plurality of kinds of signs of abnormalities, the apparatuses could output these detected events in a mixed manner. Thus, each of the apparatuses disclosed in PTLs 1 to 4 has a problem in that the operator cannot appropriately grasp the system status in the above case.

Thus, there is demanded a technique that separates, when a plurality of events occur in an analysis target system, the individual events from each other and outputs information corresponding to an individual one of the events. It is an object of the present invention to provide a system analysis method, a system analysis apparatus, and a program that contribute to separating, when a plurality of events occur in the analysis target system, the individual events from each other and outputting information corresponding to an individual one of the events.

According to the present invention and a first aspect disclosed, there is provided a system analysis method, including: acquiring history information indicating in time order, based on sensor values outputted by a plurality of sensors arranged in a system, whether an individual one of the sensor values outputted by the respective sensors indicates an abnormality and/or whether an individual relationship between sensor values outputted by different sensors indicates an abnormality; estimating a change point group of change points, each of which indicates a time point at which state of the system has changed, based on the history information; estimating relevance levels, each of which indicates a relevance to the state of system between two arbitrary time points included in the change point group; a stop of generating groups of change point groups by classifying the change point group into a plurality of groups based on the history information and the relevance levels; and generating and outputting output information, which is information relating to an abnormality per group of the change point groups.

According to the present invention and a second aspect disclosed, there is provided a system analysis apparatus, including: a history information acquisition part that acquires history information indicating in time order, based on sensor values outputted by a plurality of sensors arranged in a system, whether an individual one of the sensor values outputted by the respective sensors indicates an abnormality and/or whether an individual relationship between sensor values outputted by different sensors indicates an abnormality; a change point estimation part that estimates a change point group of change points, each of which indicates a time point at which the state of the system has changed, based on the history information; a relevance level estimation part that estimates relevance levels, each of which indicates a relevance to the state of system between two arbitrary time points included in the change point group; a clustering part that generates groups of change point groups by classifying the change point group into a plurality of groups based on the history information and the relevance levels; and an output part that generates and outputs output information, which is information relating to an abnormality per group of the change point groups.

According to the present invention and a third aspect disclosed, there is provided a program, causing a computer to execute: processing for acquiring history information indicating, based on sensor values outputted by a plurality of sensors arranged in a system, whether an individual one of the sensor values outputted by the respective sensors indicates an abnormality and/or whether an individual relationship between sensor values outputted by different sensors indicates an abnormality; processing for estimating a change point group of change points, each of which indicates a time point at which state of the system state has changed, based on the history information; processing for estimating relevance levels, each of which indicates a relevance to the state of the system between two arbitrary time points included in the change point group; processing for generating groups of change point groups by classifying the change point group into a plurality of groups based on the history information and the relevance levels; and processing for generating and outputting output information, which is information relating to an abnormality per group of the change point groups.

This program can be stored in a computer-readable storage medium. The storage medium may be a non-transient storage medium such as a semiconductor memory, a hard disk, a magnetic storage medium, or an optical storage medium. The present invention may be embodied as a computer program product.

According to the present invention and the individual aspects disclosed, there are provided a system analysis method, a system analysis apparatus, and a program that contribute to separating, when a plurality of events occur in an analysis target system, the individual events from each other and outputting information corresponding to an individual one of the events.

BRIEF DESCRIPTION OF THE DRAWINGS

FIG. 5 illustrates an example of the output result of the system analysis apparatus according to the first exemplary embodiment.

FIG. 7 illustrates an example of the output result of the system analysis apparatus according to the first exemplary embodiment.

FIG. 8 illustrates an example of the output result of the system analysis apparatus according to the first exemplary embodiment.

PREFERRED MODES

Figure 1:
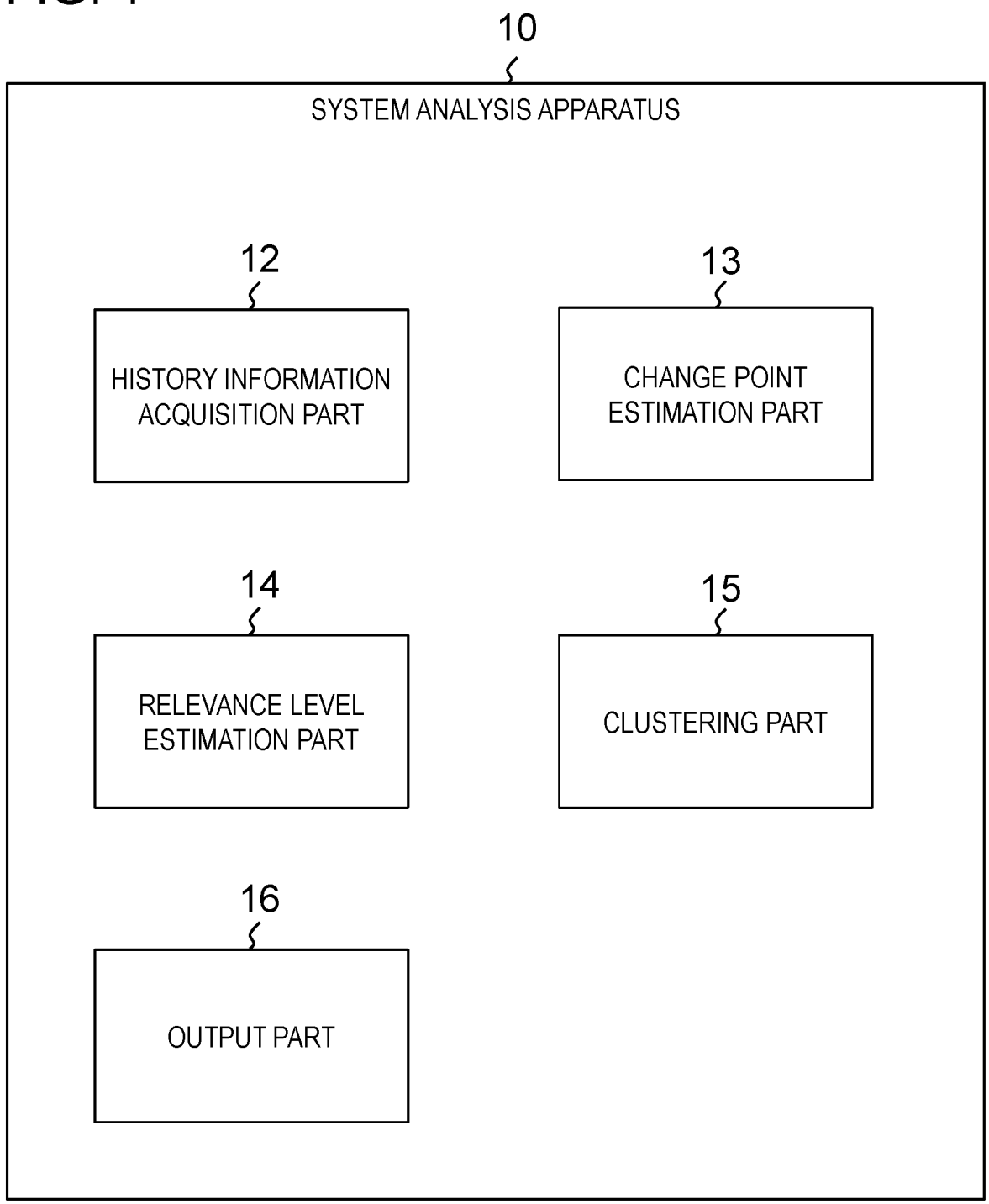
FIG. 1 is a block diagram illustrating an example of a configuration of a system analysis apparatus according to an exemplary embodiment.

First, an outline of an exemplary embodiment will be described. Reference characters in the following outline are used as examples to facilitate understanding of the present invention, not to limit the present invention to the illustrated modes. An individual connection line between blocks in an individual drawing signifies both one-way and two-way directions. An arrow schematically illustrates a principal signal (data) flow and does not exclude bidirectionality.

FIG. 1 is a block diagram illustrating an example of a configuration of a system analysis apparatus 10 according to an exemplary embodiment. As illustrated in FIG. 1, the system analysis apparatus 10 includes a history information acquisition part 12, a change point estimation part 13, a relevance level estimation part 14, a clustering part 15, and an output part 16.

The history information acquisition part 12 acquires history information indicating, based on sensor values outputted by a plurality of sensors (sensors 21 in FIG. 2 or 3, for example) arranged in a target system (an analysis target system 200 in FIG. 2 or 3, for example), whether an individual one of the sensor values outputted by the respective sensors indicates an abnormality and/or whether an individual relationship between sensor values outputted by different sensors indicates an abnormality in a time-series manner. The change point estimation part 13 estimates a change point group of change points, each of which indicates a time point at which a system state has changed, based on the history information. The relevance level estimation part 14 estimates relevance levels, each of which indicates a relevance to the system state between two arbitrary time points included in the change point group. The clustering part 15 generates groups of change point groups by classifying the change point group into a plurality of groups based on the history information and the relevance levels. The output part 16 generates and outputs output information, which is information relating to an abnormality per group of the change point groups.

This system analysis apparatus 10 classifies a group of change points in the system into groups not only based on the relevance levels to the system state but also based on the history information in view of the corresponding temporal change and outputs information relating to a system abnormality per group. An individual one of the groups of change point groups is generated per event. Thus, according to the present exemplary embodiment, when a plurality of events occur in the analysis target system, it is possible to separate these events from each other and output information corresponding to an individual one of the events.

Hereinafter, "an abnormality of a sensor value outputted by a sensor" will also simply be referred to as "an abnormality of a sensor". In addition, "(an abnormality of) a relationship between sensor values outputted by different sensors" will also simply be referred to as "(an abnormality of) a relationship between sensors".

Exemplary Embodiment 1

Next, a system analysis apparatus, a system analysis method, and a program according to a first exemplary embodiment will be described with reference to FIGS. 2 to 9.

Configuration

Figure 2:
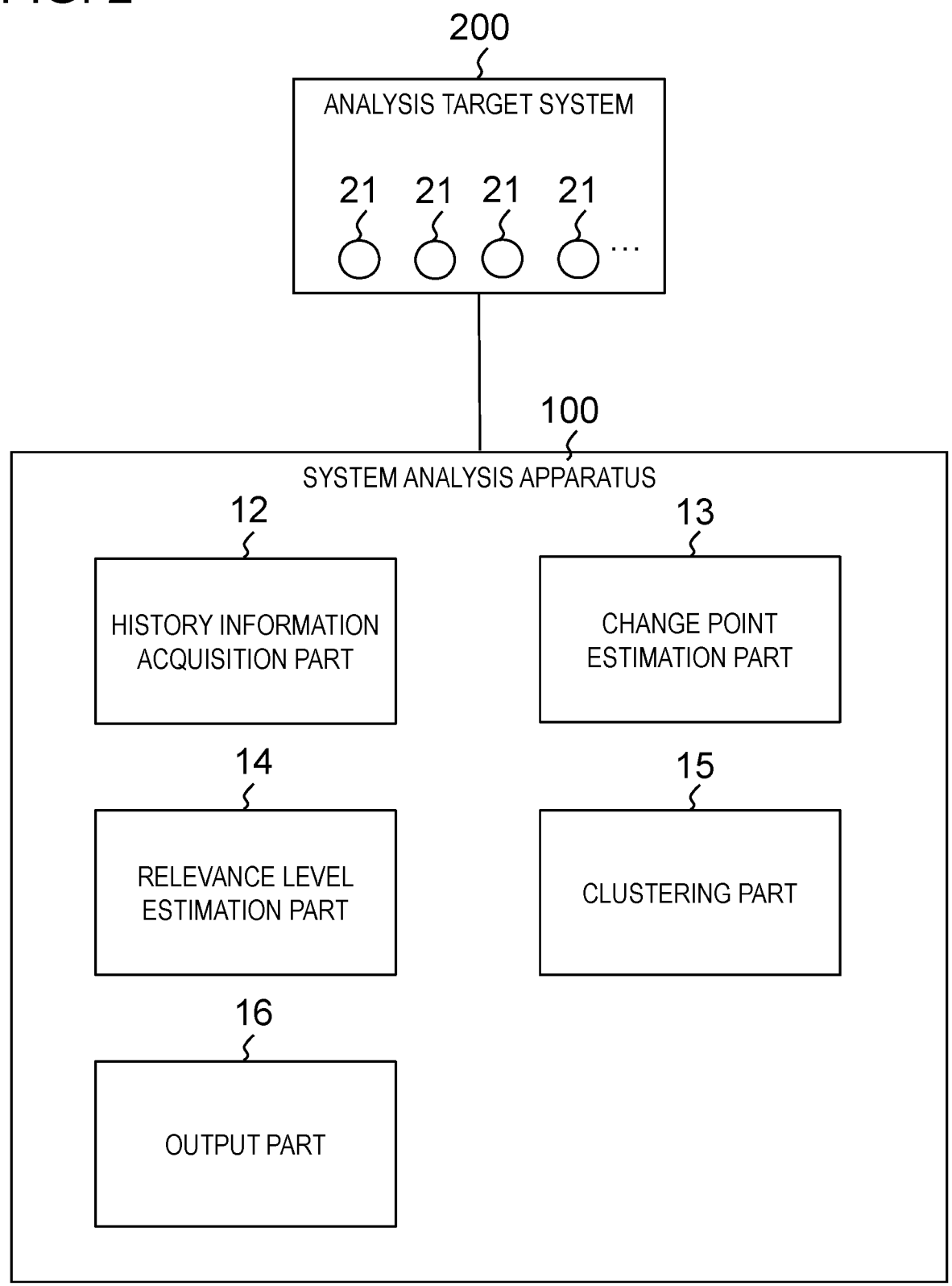
FIG. 2 is a block diagram illustrating a schematic configuration of a system analysis apparatus according to a first exemplary embodiment.

First, a schematic configuration of a system analysis apparatus according to the present exemplary embodiment will be described with reference to FIG. 2. FIG. 2 is a block diagram illustrating an example of a schematic configuration of a system analysis apparatus 100 according to the present exemplary embodiment.

As illustrated in FIG. 2, the system analysis apparatus 100 according to the present exemplary embodiment is an apparatus that analyzes a target system (which will hereinafter be referred to as "an analysis target system") 200. The system analysis apparatus 100 includes a history information acquisition part 12, a change point estimation part 13, a relevance level estimation part 14, a clustering part 15, and an output part 16.

Based on a processing result of a sensor value outputted by an individual one of a plurality of sensors 21 arranged in the analysis target system 200, the history information acquisition part 12 acquires history information about an individual sensor 21 and/or history information about an individual relationship between sensors 21. The number of sensors 21 arranged in the analysis target system 200 is not limited to 4. The history information includes identifiers, each of which indicates a sensor 21 or a relationship between sensors 21, determination results, each of which indicates a normality or an abnormality at an individual time point, and time points, each of which corresponds to an individual determination result.

The change point estimation part 13 estimates a change point group based on the acquired history information. A single change point has a corresponding time point.

The relevance level estimation part 14 estimates a relevance level between two arbitrary time points included in the estimated change point group.

The clustering part 15 generates groups of change point groups based on the acquired history information and the estimated relevance levels.

The output part 16 generates and outputs output information per generated group of change point groups. The output information is information useful for grasping the states of abnormalities that have occurred and determining the causes of the abnormalities. For example, the information is a list of names of sensor groups relating to abnormalities, time periods at which the abnormalities have started to occur, or sensors relating to the abnormalities visualized on a system configuration diagram. Alternatively, the information may be names of similar past problems that have occur, the problems having been found by searching based on the sensors relating to the abnormalities and/or inter-sensor relationships. The information may be a link to a report about a similar past problem, for example.

The sensor values outputted by the individual sensors 21 are various kinds of values obtained from components in the analysis target system 200. For example, measured values acquired via sensors 21 arranged at components in the analysis target system 200 are used as sensor values. Examples of such measured values include a valve opening level, a liquid level, a temperature, a flow rate, a pressure, a current, and a voltage. In addition, estimated values calculated by using these measured values may be used as sensor values. In addition, a control signal outputted by an information processing apparatus for changing the analysis target system 200 to a desired operating state may be used as a sensor value.

As described above, according to the present exemplary embodiment, the system analysis apparatus 100 classifies a group of change points in the system into groups not only based on the relevance levels to the system state but also based on the history information in view of the corresponding temporal change and outputs information relating to an abnormality per group. An individual one of the groups of change point groups is generated per event. Thus, according to the present exemplary embodiment, when a plurality of events occur in the analysis target system, it is possible to separate these events from each other and output information corresponding to an individual one of the events.

Figure 3:
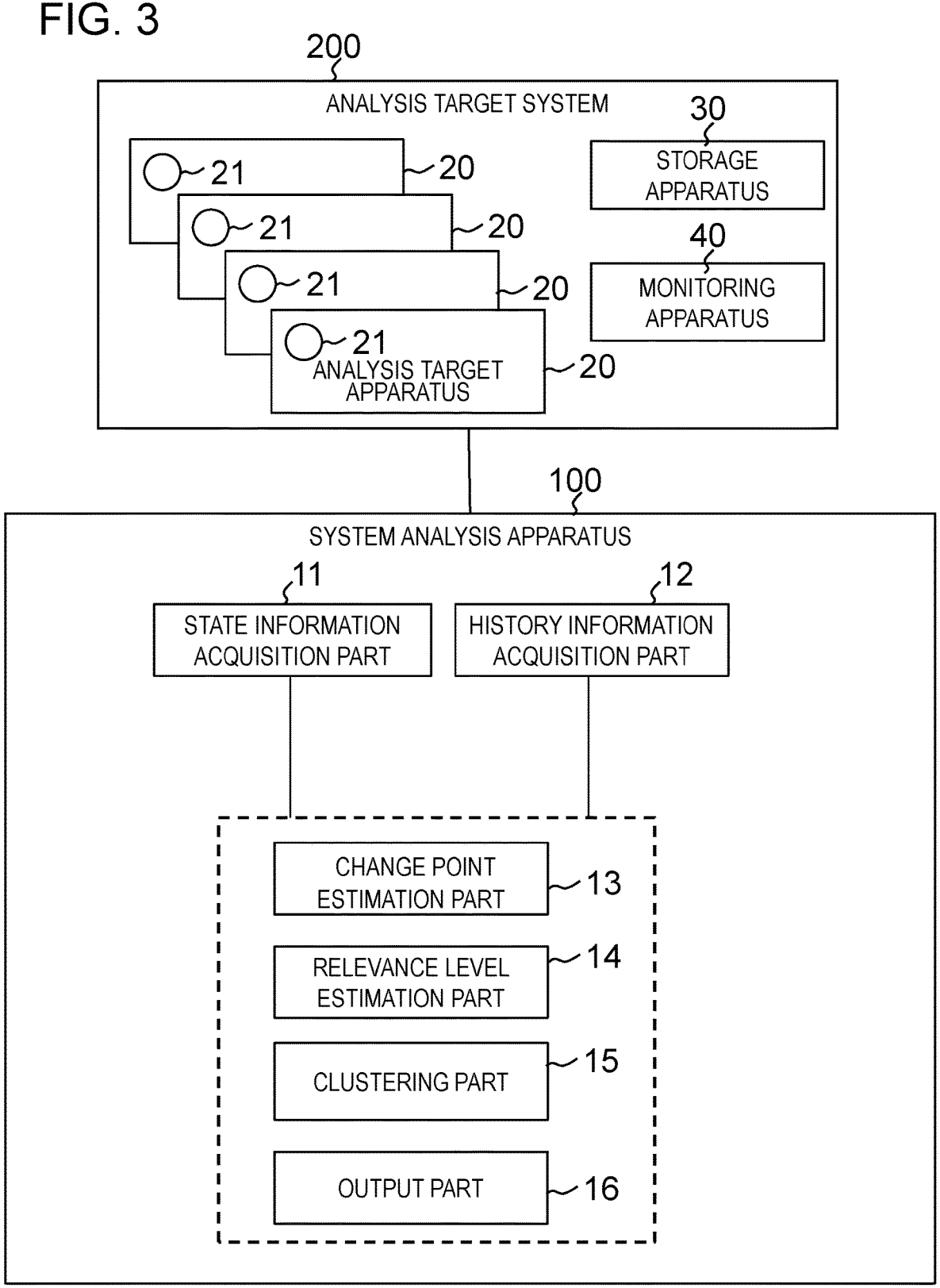
FIG. 3 is a block diagram illustrating an example of a specific configuration of the system analysis apparatus according to the first exemplary embodiment.

Next, a configuration of the system analysis apparatus 100 according to the present exemplary embodiment will be described in more detail with reference to FIG. 3. FIG. 3 is a block diagram illustrating an example of a specific configuration of the system analysis apparatus 100 according to the present exemplary embodiment.

As illustrated in FIG. 3, the system analysis apparatus 100 according to the present exemplary embodiment may further include a state information acquisition part 11, in addition to the history information acquisition part 12, the change point estimation part 13, the relevance level estimation part 14, the clustering part 15, and the output part 16. These parts will be described below.

In addition, as illustrated in FIG. 3, the system analysis apparatus 100 is connected to the analysis target system 200 via a network. The system analysis apparatus 100 analyzes abnormalities that have occurred in the analysis target system 200 from the sensor values from the analysis target system 200 and outputs an analysis result and additional information. In FIG. 3, a dashed rectangle surrounding the change point estimation part 13, the relevance level estimation part 14, the clustering part 15, and the output part 16 signifies that the individual functional blocks surrounded by the dashed line operate based on information outputted by the state information acquisition part 11 and the history information acquisition part 12.

In addition, according to the present exemplary embodiment, the analysis target system 200 includes at least one analysis target apparatus 20, which will be analyzed. For example, the analysis target system 200 may be a power plant system. In this case, the analysis target apparatuses 20 are a turbine, a feed-water heater, a condenser, etc. For example, an analysis target apparatus 20 may include elements such as pipes and signal lines connecting apparatuses. The analysis target system 200 may be a whole system such as the above power plant system or a part of a system that realizes a part of the functions of the system. Alternatively, the analysis target system 200 may be a group or a mechanism that is constituted by elements affecting each other, such as an information and communication technology (ICT) system, a chemical plant, an electric power plant, or power facilities.

A sensor 21 arranged in an individual one of the analysis target apparatuses 20 measures a sensor value per predetermined timing and transmits the measured sensor value to the system analysis apparatus 100. In addition, according to the present exemplary embodiment, an individual sensor 21 is not limited to an object having tangible presence as hardware such as a normal measuring device. Namely, the individual sensors 21 may be software and control signal output sources, and these sensors will collectively be referred to as "sensors".

A "sensor value" is a value obtained from a sensor 21. Examples of a sensor value include a measured value such as a valve opening level, a liquid level, a temperature, a flow rate, a pressure, a current, or a voltage, which has been measured by a measuring device installed at facilities. Other examples of the sensor value include an estimated value calculated from a measured value and a value of a control signal. The following description assumes that an individual sensor value is represented by a numerical value such as an integer or a decimal. In FIG. 3, a single sensor 21 is arranged for a single analysis target apparatus 20. However, the number of sensors 21 arranged for a single analysis target apparatus 20 is not particularly limited. If the measurement target of a sensor 21 becomes abnormal, the corresponding sensor value indicates an abnormality. However, if a sensor 21 itself becomes abnormal (defective), the corresponding sensor value also indicates an abnormality.

In addition, the present exemplary embodiment assumes that a single data item is assigned to each sensor 21 corresponding to a sensor value obtained from an individual analysis target apparatus 20. In addition, a group of sensor values collected at timings estimated to be the same timing from individual analysis target apparatuses 20 will be denoted as "state information". In addition, a group of data items corresponding to the sensor values included in such state information will be denoted as "a data item group". For example, if one sensor 21 measures "the temperature inside a tank A" and another sensor 21 measures "the flow rate of a pipe A", "the temperature inside the tank A" and "the flow rate of the pipe A" are included in a data item group.

Namely, according to the present exemplary embodiment, the state information is constituted by a plurality of data items. Herein, "collected at timings estimated to be the same timing" may signify "measured at the same time point or time points within a predetermined range by the individual analysis target apparatuses 20". Alternatively, "collected at timings estimated to be the same timing" may signify "collected by a series of collection processing by the system analysis apparatus 100.

According to the present exemplary embodiment, the analysis target system 200 includes a storage apparatus 30 that holds the sensor values acquired from the analysis target apparatuses 20. Examples of the storage apparatus include a data server, a distributed control system (DCS), supervisory control and data acquisition (SCADA), and a process computer. The individual analysis target apparatuses 20 acquire sensor values at arbitrary timings and store the acquired sensor values in the storage apparatus 30.

In addition, according to the present exemplary embodiment, the analysis target system 200 includes a monitoring apparatus 40 that generates and stores history information based on the sensor values acquired from the analysis target apparatuses 20. Examples of the monitoring apparatus include an apparatus that detects an abnormality of a data item and/or an abnormality about a relationship between data items by using rules, statistical models, etc., such as a system analysis apparatus using a DCS or statistical process management.

Next, an individual functional block of the system analysis apparatus 100 will be described in detail.

The state information acquisition part 11 acquires state information corresponding to a predetermined period from the storage apparatus 30. For example, the predetermined period is a period from the current time point to a predetermined time point in the past.

The history information acquisition part 12 acquires history information corresponding to the predetermined period from the monitoring apparatus 40. For example, the predetermined period is a period from the current time point to a predetermined time point in the past.

The change point estimation part 13 estimates a change point group based on the history information. The change point estimation part 13 estimates up to one change point per identifier indicating a data item (sensor 21) and a relationship between data items (sensors 21) included in the history information. Thus, an identifier corresponds to a single change point. A change point is a time point at which an abnormality that continuously appears until the current time point included in the history information has occurred. If an abnormality does not continuously appear until the current time point included in the history information, the change point estimation part 13 does not estimate a change point for the corresponding identifier. Thus, this identifier has no change point.

The change point estimation part 13 may evaluate continuity of an abnormality per identifier included in the history information by using statistical processing and may estimate a change point by using the evaluation result. This is because sensor data could be fluctuated by sensor noise or disturbance, and as a result, the determination result of abnormality/normality included in the history information could also be fluctuated. Thus, by performing statistical processing, the change point estimation part 13 can estimate a change point more accurately. Specifically, the change point estimation part 13 first divides a predetermined period into a plurality of periods and determines, per divided period, whether the ratio of time determined as an abnormality is over a predetermined threshold. Next, the change point estimation part 13 assumes the current time point in the predetermined period as the end point, determines a plurality of divided period groups whose determination results continuously indicate an abnormality, and sets the oldest time point corresponding to the determined divided period groups as a change point. However, in this method, if the time determined as an abnormality is disproportionate among the divided periods, the time of the change point estimated could be older than the actual occurrence of the abnormality. To address this problem, the time point of the change point may be adjusted based on a threshold applied to the ratio of the time determined as an abnormality. For example, if the threshold is 30%, time corresponding to 70% of the divided period is added to the time point of the unadjusted change point. This is based on an idea that the abnormalities are concentrated on 30% of the more recent time period sides of the divided periods. The user may give an arbitrary numerical value to set the predetermined threshold used for the determination in the divided periods. Alternatively, a statistical method may be used to set the predetermined threshold. For example, the predetermined threshold may be set based on a confidence interval of a Poisson distribution regarding the lengths of the divided periods when the normality or abnormality fluctuation is assumed to be random.

The relevance level estimation part 14 estimates a relevance level between two arbitrary change points. To estimate the relevance level, the relevance level estimation part 14 first calculates an abnormality level of an individual sensor 21 per change point and generates an abnormality level vector per change point. Next, the relevance level estimation part 14 calculates the relevance level as the similarity level between these two abnormality level vectors. The relevance level estimation part 14 may calculate an abnormality level of any kind, as long as the relevance level estimation part 14 calculates an abnormality level per sensor. As the method for calculating this abnormality level, for example, the abnormality level calculation method in PTL 1 or the abnormality score calculation method in PTL 4 may be used. In the abnormality level calculation method in PTL 1, the abnormality level at a time point corresponding to a change point is calculated by using state information acquired by the state information acquisition part 11. In the abnormality score calculation method in PTL 4, the state information acquisition part 11 is not necessarily needed. The system analysis apparatus can be configured without the state information acquisition part 11 according to the present exemplary embodiment. This is because, as long as the relevance level estimation part 14 holds a correlation model described in PTL 4, an abnormality level can be calculated from the correlation model (a relationship between data items) and the corresponding normality/abnormality determination result. Regarding a change point, the corresponding normality/abnormality determination result can be calculated only from the history information, as in the processing by the change point estimation part 13.

While the characteristics of the similarity level between vectors calculated by the relevance level estimation part 14 are not particularly limited, it is desirable that the similarity level be not affected by the absolute value of the abnormality level. This is because the disclosure of the present application aims to separate change points per event and prevent change points whose severity alone has increased from being separated from those belonging to the same event. Examples of the definition of the similarity level having such characteristics include the cosine similarity level (1-cosine distance). Alternatively, the calculated inter-vector similarity levels do not need to be consecutive values based on the corresponding similarities. Namely, the calculated inter-vector similarity levels may be discrete values. For example, in the similarity calculation, if a calculated similarity level is less than a predetermined value, post-processing for setting the similarity level to an arbitrary constant may be performed, and the constant may be used as the final inter-vector similarity level.

When generating groups of change point groups, the clustering part 15 calculates the distance between change points based on the acquired history information and the corresponding relevance level estimated. Any distance may be used as the distance between change points, as long as the distance is determined in view of the corresponding temporal distance and relevance level between change points. For example, the temporal distance between change points is the difference between the time points of the change points or a normalized value obtained by multiplying the time points by a constant. The time points of the change points are obtained by processing of the change point estimation part 13 based on the acquired history information. For example, the distance between change points is a product of a non-relevance level calculated from the corresponding relevance level and the temporal distance between the change points. A non-relevance level is, for example, a reciprocal of the relevance level or a value obtained by subtracting the relevance level from a constant. The distance between change points may be calculated by combining a plurality of calculation methods. For example, if change points are temporally close to each other, the distance between these change points may be calculated by a predetermined mathematical expression. If change points are not temporally close to each other, a maximum value that could be taken by the distance between these change points may be set as the corresponding distance.

The clustering part 15 generates groups of change point groups, based on the calculated inter-change-point distances. The clustering part 15 generates at least one group of change point groups, and each group of change point groups includes at least one change point. The clustering part 15 uses a clustering algorithm to generate these groups of change point groups. Based on the distance or similarity level between clustering targets, the clustering algorithm groups the targets. Examples of this clustering algorithm include k-means, x-means, affinity propagation, and spectral clustering. The clustering part 15 may generate groups of change point groups in such a manner that only change points that are temporally close to each other are grouped. In this case, for example, clustering using an Ising model may be used.

In addition, the clustering part 15 may perform clustering a plurality of times by using clustering results sequentially. The clustering part 15 may adjust the relevance level or the distance between change points per clustering. As this adjustment, for example, the clustering part 15 may perform processing for further reducing the distance between change points that have been grouped once. In the second and subsequent clustering, instead of the individual distance between change points, the clustering part 15 may calculate the individual distance between change point groups and perform clustering again on the change point groups based on the distance.

As a specific example of an operation of the clustering part 15, how groups of change point groups are generated by using an Ising model will be described. In this method, change points, which are clustering targets, are assumed to be atoms, each of which can have either an upward or downward spin state, and this group of atoms are one-dimensionally arranged. In addition, the spin directions of the individual atoms corresponding to when the energy of the group of atoms is minimum are obtained. In this state, if there is an atom whose spin direction matches the spin direction of a neighboring atom, these atoms are considered to belong to the same group. The sequence of atoms is determined by the time points of the change points, and the present example assumes that the atoms are arranged chronologically. The following description assumes that $t_i$ represents the time point of an individual change point, $J_{(i, i+1)}$ represents the exchange interaction energy between change points, and $s_i$ represents the spin direction. Regarding the spin direction, 1 represents the upward direction, and −1 represents the downward direction, for convenience. Herein, i is an index that represents an individual change point and is a positive integer. The number of change points is N. In this case, an energy E of the entire atom group is given by expression (1).

$$E = -\sum_{i=1}^{N-1} J_{\{i,i+1\}} s_i s_{i+1} \qquad (1)$$

The exchange interaction energy corresponds to the similarity, and the larger this value is in the positive direction, the more likely a neighboring atom spins in the same direction. Namely, the corresponding change points are more likely to belong to the same group. In contrast, the larger this value is in the negative direction, the more like a neighboring atom spins in the different direction. Namely, the corresponding change points make a boundary between groups.

For example, the exchange interaction energy $J_{(i, i+1)}$ is given by expression (2), assuming that $D_{(i, i+1)}$ represents the relevance level between change points, a represents an adjustment parameter, and $D_{(i, i+1)}$ takes a real number from 0 to 1.

$$J_{\{i,i+1\}} = -1 + \frac{4}{1 + a \exp\{(1 - D_{\{i,i+1\}})(t_{i+1} - t_i)\}} \qquad (2)$$

The number of clusters changes if the adjustment parameter a is changed. For example, the number of clusters may be a predetermined number or may be a number such that all the distances, each being between change point groups, represent a predetermined value or more.

The number of clusters may be determined by changing only the adjustment parameter a. Alternatively, the number of clusters may be determined by repeating the clustering a plurality of times. For example, the number of clusters may be determined by alternately changing the adjustment parameter a and the relevance level $D_{(i, i+1)}$ between change points. In this case, a maximum value is determined in advance as the number of clusters, and the adjustment parameter a is adjusted so that the number of clusters reaches the maximum value. Next, based on the obtained clusters, the relevance level $D_{(i, i+1)}$ is updated. For example, if change points are determined to belong to the same group, the relevance level is set to 1. If change points are determined to make a boundary of groups, a relevance level between groups is set. The relevance level between groups can be calculated in the same way as the processing by the relevance level estimation part 14. For example, regarding two neighboring change point groups, a data item abnormality level may be calculated for the change point group earlier in time and a group in which both the change point groups are aggregated. Next, information obtained by converting the corresponding distance into a similarity level may be calculated as the relevance level between groups. If a change point group includes data items and a relationship between the data items, the abnormality levels of the data items may be calculated by using the method in PTL 4. If the abnormality level of a data item takes a value from 0 to 1, an abnormal data item takes 1, and the abnormality level of another data item is calculated by using the relationship between abnormal data items and a correlation model. In this case, inconvenience caused by using two kinds of calculation methods can be avoided by calculating the abnormality level of another data item while excluding those included in a change point group as data items.

Figure 4:
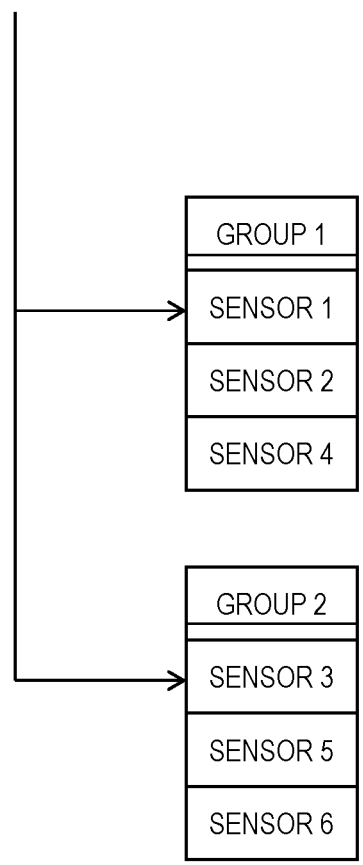
FIG. 4 illustrates an example of an output result of the system analysis apparatus according to the first exemplary embodiment.

The output part 16 generates and outputs output information per generated group of change point groups. For example, as illustrated in FIG. 4, the output part 16 may arrange a list of data items included in the change point groups obtained by the grouping by the clustering part 15 in the chronological order corresponding to the change point groups and may output the arranged list. For example, regarding the outputted list of data items, data items for which an abnormality is particularly suspected or data items directly connected to the cause of an abnormality may be narrowed down based on the abnormality levels of the data items. For example, if change points corresponding to the relationship between data items are included in a change point group, the abnormality level per data item may be calculated as is the case with the clustering part 15, and data items to be outputted may be narrowed down based on the abnormality levels of the data items. Alternatively, for example, as illustrated in FIG. 5, the output part 16 may additionally output a result obtained by estimating the time range in which the abnormalities could have occurred per change point group. The time range in which the abnormalities could have occurred may be from the earliest time point to the latest time point corresponding to change points included in a change point group. FIGS. 4 and 5 only illustrate examples of an output result of the system analysis apparatus 100 according to the present exemplary embodiment. The output result is not limited to the illustrated modes.

According to the present exemplary embodiment, the output part 16 may output, in addition to the groups, the abnormality levels of the data items belonging to the target groups at predetermined time points, statistical values thereof, or recalculated values thereof. The presentation method of the groups of sensors 21 by the output part 16 is not limited to the above methods.

Figure 6:
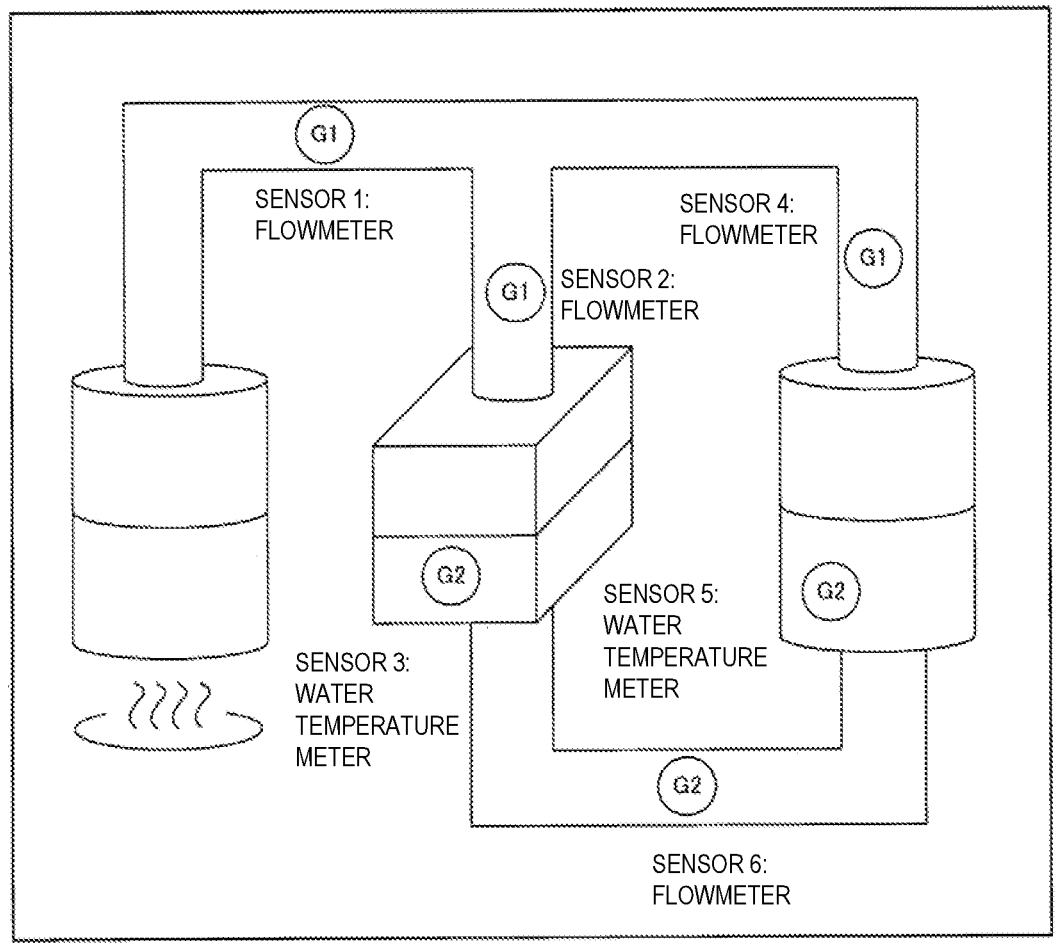
FIG. 6 illustrates an example of the output result of the system analysis apparatus according to the first exemplary embodiment.

As illustrated in FIG. 6, the output part 16 may present data items on a system configuration diagram as markers (identifiers) that can identify the corresponding groups. In this case, the output part 16 may output markers that indicate the sequence of time points at which the abnormalities could have occurred.

FIG. 6 illustrates an example of an output result obtained by the system analysis apparatus 100 according to the present exemplary embodiment. The analysis target system illustrated in FIG. 6 is a power plant system. In addition, in FIG. 6, the number immediately after each G in G1 and G2 is the number added to the corresponding group. The output part 16 may use a different representation method using colors, shapes, etc., other than character strings, as the representation method that indicates the sequence of time points at which the abnormalities could have occurred. In addition, the group representation method is not limited the illustrated mode, either.

Alternatively, when presenting displayed groups, the output part 16 may switch the displayed groups in accordance with the sequence of time points at which the abnormalities could have occurred. In this case, instead of completely switching the display, the output part 16 may switch the groups to be emphasized. In addition, the output part 16 may perform this switching automatically at predetermined time intervals. The output part 16 may repeat a series of display processing including this switching at a predetermined number of times or until receiving a user operation.

Alternatively, the output part 16 may display only a part of the groups. In this case, instead of completely switching the display, the output part 16 may emphasize and display the part of the groups.

Alternatively, when presenting displayed groups, the output part 16 may switch the displayed groups in accordance with the sequence of time points at which the abnormalities could have occurred. In this case, instead of completely switching the display, the output part 16 may switch the groups to be emphasized. The output part 16 may perform this switching based on a user operation or may automatically perform this switching at predetermined time intervals. The output part 16 may repeat a series of display processing including this switching at a predetermined number of times or until receiving a user operation.

As illustrated in FIG. 7, the output part 16 may add the symbols of the individual groups to the time periods corresponding to the abnormality start time points of the individual groups and may output time-series data of the abnormality level index(es) (indicating the abnormality level(s)) about the system or apparatus(es). By outputting this data, the abnormality level and the transition of the abnormality state can collectively be grasped. Thus, the user can grasp the status of the analysis target system 200 effectively.

As illustrated in FIG. 8, the output part 16 may additionally output a result obtained by estimating the time range in which the abnormalities could have occurred per change point group and a similar past problem(s). The similar past problem(s) may be retrieved based on a data item(s) included in a change point group(s) and an inter-data-item relationship(s).

The output part 16 may present a ratio of the kinds of the physical amounts of the sensors 21 included in a corresponding group or groups and a ratio of the systems of the sensors 21 included in a corresponding group as a pie chart or a list. The "system" indicates a functional system configuration unit. The "system" may be specified in advance by the operator.

Operation

Figure 9:
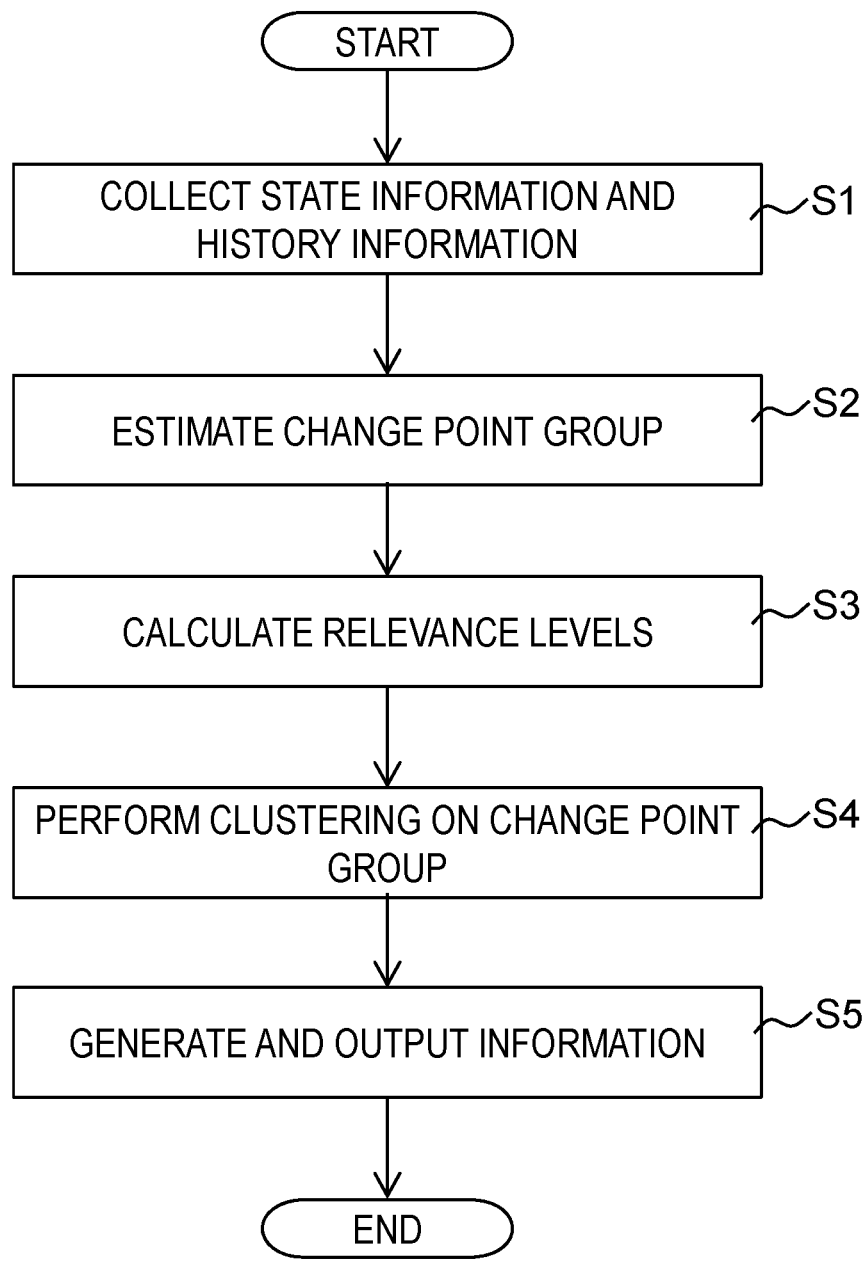
FIG. 9 is a flowchart illustrating an example of an operation of the system analysis apparatus according to the first exemplary embodiment.

Next, an operation of the system analysis apparatus 100 according to the present exemplary embodiment will be described with reference to FIG. 9. FIG. 9 is a flowchart illustrating an example of an operation of the system analysis apparatus 100 according to the present exemplary embodiment. The following description will refer to FIGS. 2 and 3, as needed. In addition, according to the present exemplary embodiment, the system analysis method is performed by operating the system analysis apparatus 100. Thus, the system analysis method according to the present exemplary embodiment will be described through the following operation of the system analysis apparatus 100.

As an example, the following description assumes that the relevance level estimation part 14 calculates the abnormality level of an individual sensor 21 per change point by using a correlation model, which has previously been acquired.

As illustrated in FIG. 9, in step S1, the history information acquisition part 12 collects history information in a predetermined period from the analysis target system 200. In addition, the state information acquisition part 11 collects state information.

Next, the change point estimation part 13 estimates a change point group based on the history information acquired in step S1 (step S2). For example, an individual change point has an identifier that refers to a corresponding time point and a corresponding data item or inter-data item relationship.

Next, the relevance level estimation part 14 calculates inter-change-point relevance levels for the change point group estimated from the history information in step S2 (step S3). To calculate the relevance level between two arbitrary change points, the relevance level estimation part 14 calculates an abnormality level vector for each of these change points. The relevance level estimation part 14 calculates a similarity level between these abnormality level vectors and uses the similarity level as the relevance level between the change points.

Next, based on the history information collected in step S1 and the relevance levels estimated in step S3, the clustering part 15 classifies the change point group estimated in step S2 into at least one group by using the above clustering method and generates at least one change point group (step S4).

Next, the output part 16 generates the above output information from the groups of sensors 21 obtained by the clustering in step S4 and outputs the output information (step S5).

In this way, the processing of the system analysis apparatus 100 is completed. After a predetermined period, when the analysis target system 200 outputs history information, the system analysis apparatus 100 performs steps S1 to S5, again.

Advantageous Effects

As described above, according to the present exemplary embodiment, the system analysis apparatus 100 classifies the change points into groups based on the individual relevance level between change points, in addition to the individual temporal distance between change points. Thus, even when change points have a close temporal distance, if these change points have a low relevance level, these change points can be separated. In contrast, even when change points have a remote temporal distance, if these change points have a high relevance level, these change points can be estimated to belong to the same group. As a result, even when a plurality of events are included, the system analysis apparatus 100 can separate the events by performing clustering. Thus, the system analysis apparatus 100 can output information per event.

Program

A program according to the present exemplary embodiment causes a computer to perform steps S1 to S5 illustrated in FIG. 9. By installing the program to the computer and executing the program, the system analysis apparatus 100 and the system analysis method according to the present exemplary embodiment can be realized. In this case, a CPU (central processing unit) of the computer performs processing while serving as the history information acquisition part 12, the change point estimation part 13, the relevance level estimation part 14, the clustering part 15, and the output part 16.

The program according to the present exemplary embodiment may be executed by a computer system established by a plurality of computers. In this case, for example, an individual computer may serve as any one of the history information acquisition part 12, the change point estimation part 13, the relevance level estimation part 14, the clustering part 15, and the output part 16.

In addition, the program according to the present exemplary embodiment is stored in a storage device of a computer that realizes the system analysis apparatus 100 and is read and executed by a CPU of the computer. In this case, the program may be provided as a computer-readable storage medium or provided via a network.

Exemplary Embodiment 2

Next, a system analysis apparatus, a system analysis method, and a program according to a second exemplary embodiment will be described with reference to FIGS. 10 to 13.

Configuration

Figure 10:
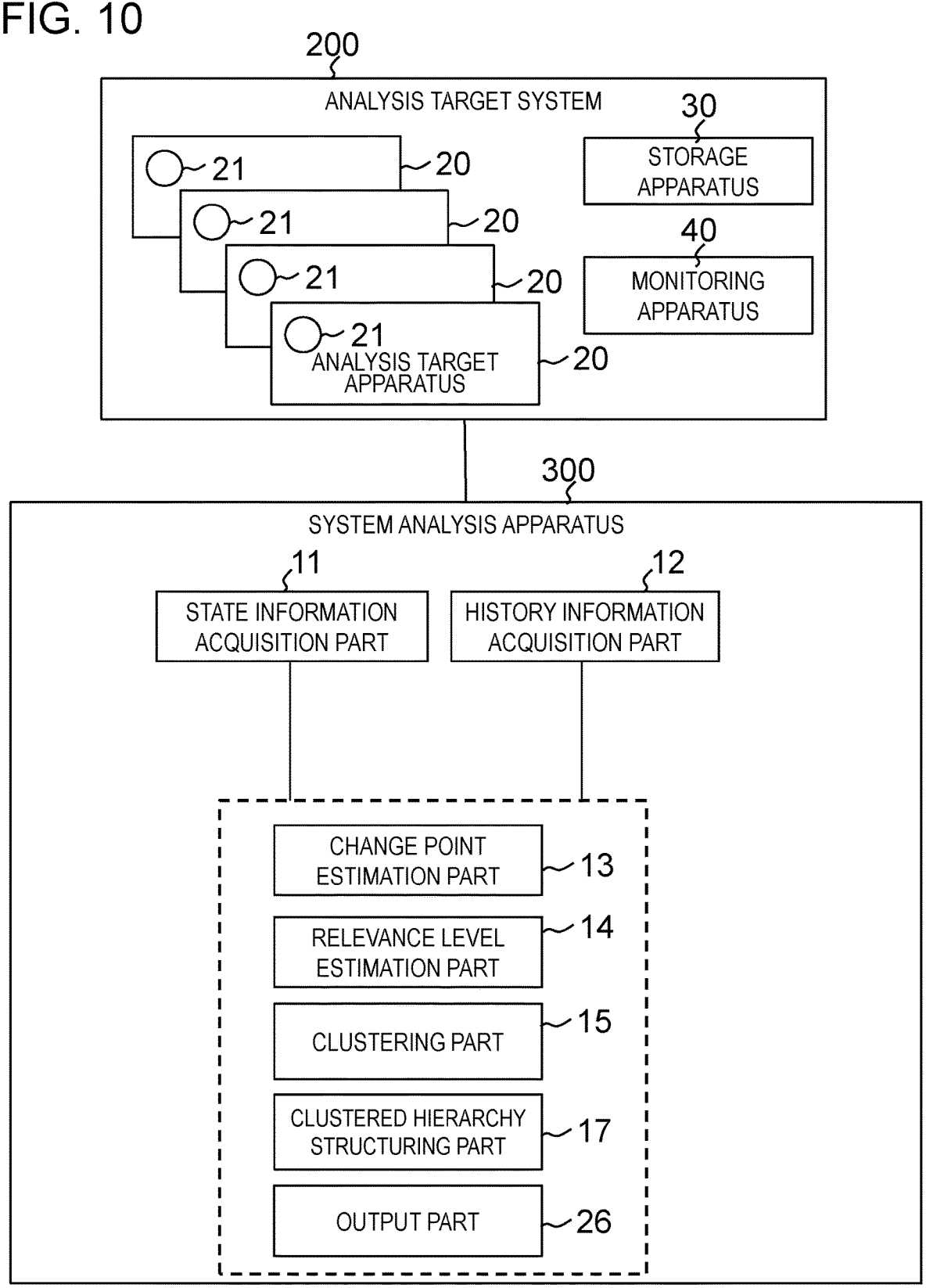
FIG. 10 is a block diagram illustrating an example of a specific configuration of a system analysis apparatus according to a second exemplary embodiment.

First, a configuration of a system analysis apparatus according to a second exemplary embodiment will be described with reference to FIG. 10. FIG. 10 is a block diagram illustrating an example of a specific configuration of a system analysis apparatus 300 according to the present exemplary embodiment.

As illustrated in FIG. 10, the system analysis apparatus 300 according to the present exemplary embodiment differs from the system analysis apparatus 100 according to the first exemplary embodiment illustrated in FIGS. 2 and 3 in that the system analysis apparatus 300 includes a clustered hierarchy structuring part 17 and an output part 26 in place of the output part 16. In the other aspects, the system analysis apparatus 300 has the same configuration as that of the system analysis apparatus 100. Hereinafter, the present exemplary embodiment will be described with a focus on the difference from the first exemplary embodiment.

The clustered hierarchy structuring part 17 uses a predetermined period of state information acquired by the state information acquisition part 11 to estimate a causal relationship between sensors 21. In addition, based on the estimated causal relationship, the clustered hierarchy structuring part 17 estimates presence or absence of a causal relationship between change point groups and gives a hierarchical structure to at least one of the change point groups generated by the clustering part 15. The estimated causal relationship between sensors 21 is causal relationship information and relationship information.

If the clustered hierarchy structuring part 17 estimates that groups have a causal relationship, the clustered hierarchy structuring part 17 gives a hierarchical structure to the groups, based on the direction of the causality between the groups. In contrast, the clustered hierarchy structuring part 17 does not give a hierarchical structure to groups that do not have a causal relationship.

The clustered hierarchy structuring part 17 adds up the number of estimated causal relationships in the causal direction regarding all or some pairs of groups and determines a causal relationship between groups based on the total value. Specifically, between two change point groups, the clustered hierarchy structuring part 17 uses data items included in a group having a change point corresponding to an earlier time point, to estimate a causal relationship with data items included in the other group. In this case, since there are sensors 21 corresponding to the data items, the individual causal relationship between data items can be converted into a causal relationship between the corresponding sensors 21. For example, as a determination condition, the clustered hierarchy structuring part 17 may use a condition that the total value is equal to or more than a preset number. Alternatively, as a determination condition, the clustered hierarchy structuring part 17 may use a condition that a value obtained by dividing the total value by the number of combinations of members of the two groups is equal to or more than a preset number.

The clustered hierarchy structuring part 17 estimates the direction of the causality between groups based on the abnormality start time of an individual group. Specifically, the clustered hierarchy structuring part 17 determines the direction from a group having the earlier abnormality start time to a group having the later abnormality start time to be the direction of the causality.

To estimate a causal relationship between sensors 21 from the time-series of the state information acquired by the state information acquisition part 11, the clustered hierarchy structuring part 17 may use a general data analysis technique, for example. The clustered hierarchy structuring part 17 may estimate a causal relationship by calculating a cross-correlation function while changing the time difference between two time-series data. Alternatively, the clustered hierarchy structuring part 17 may use a method using transfer entropy. Alternatively, the clustered hierarchy structuring part 17 may use a method of estimating the relationship between two sensors 21 based on a regression expression and estimating a causal relationship from the time delay of a coefficient of the regression expression. Alternatively, the clustered hierarchy structuring part 17 may use a method using cross mapping. The user may specify the time-series of the state information used to estimate a causal relationship, for example, by using an input device not illustrated when the clustering is performed. Alternatively, the time-series of the state information may be determined based on a preset rule. When the time-series of the state information used to estimate a causal relationship is determined based on a preset rule, for example, a time range including the history information acquired by the history information acquisition part 12 may be determined. Alternatively, a time range from the latest time in the history information acquired by the history information acquisition part 12 to a past time point previously determined by an operator may be determined. Alternatively, a time range from the latest time in the history information acquired by the history information acquisition part 12 to the oldest time point of a change point among the change points estimated by the change point estimation part 13 may be determined. Alternatively, a time range from the latest time in the history information acquired by the history information acquisition part 12 to a time point further in the past by a predetermined period from the oldest time point of a change point among the change points estimated by the change point estimation part 13 may be determined.

Figure 11:
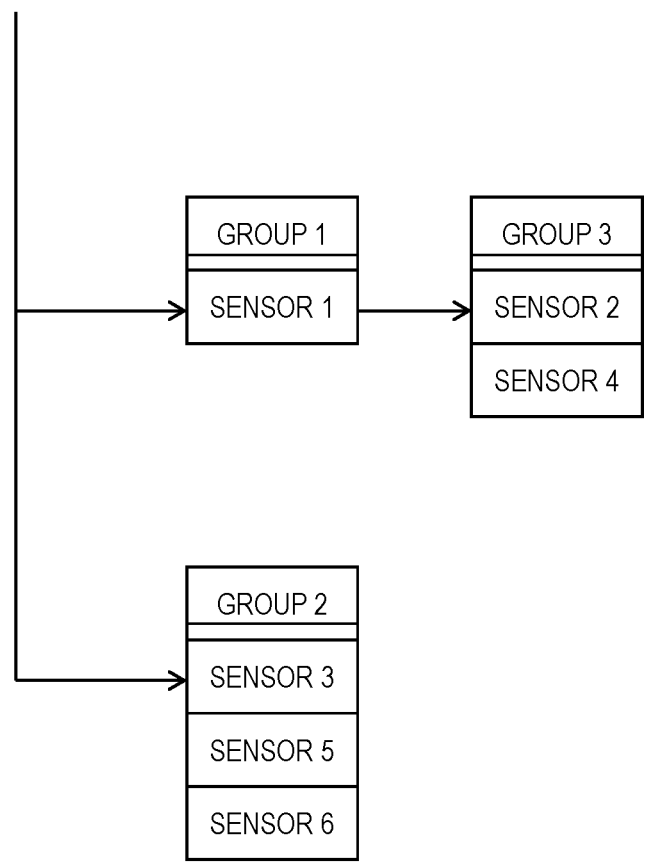
FIG. 11 illustrates an example of an output result of the system analysis apparatus according to the second exemplary embodiment.

For example, as illustrated in FIG. 11, the output part 26 arranges a list of data items included in the change point groups obtained by the grouping by the clustering part 15 based on the direction(s) of the inter-group causal relationship(s) estimated by the clustered hierarchy structuring part 17 and the chronological order of the change point groups and outputs the arranged list. In FIG. 11, the hierarchical change point groups are displayed with the direction of a causal relationship going from left to right. In addition, in FIG. 11, the display is configured such that the earliest time point corresponding to a change point group that originates the causal relationship among the hierarchical change point groups becomes late as the time point moves in a lower direction. For example, the output part 26 may additionally output a result obtained by estimating the time range in which the abnormalities could have occurred per group. FIG. 11 illustrates only an example of an output result obtained by the system analysis apparatus 300 according to the present exemplary embodiment. The output result is not limited to the illustrated mode.

In addition, according to the present exemplary embodiment, the output part 26 may output, in addition to the groups, the abnormality levels of the sensors 21 belonging to the target groups at predetermined time points, statistical values thereof, or recalculated values thereof. The presentation method of the groups of the sensors 21 by the output part 26 is not limited to these methods.

Figure 12:
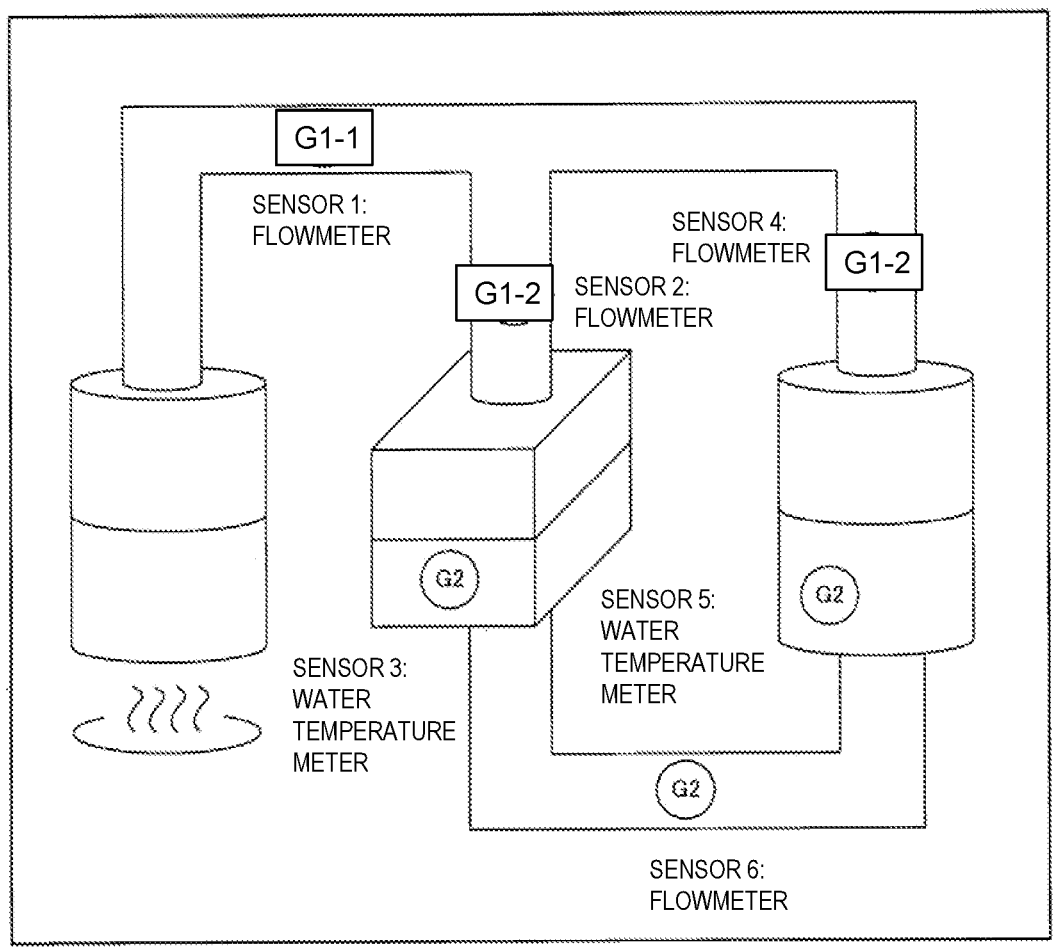
FIG. 12 illustrates an example of the output result of the system analysis apparatus according to the second exemplary embodiment.

The output part 26 may present the groups of the sensors 21 as a list of sensor names. As illustrated in FIG. 12, the output part 26 may present groups associated by hierarchical structures and the hierarchical structures on a system configuration diagram as distinguishable markers (identifiers). In the latter case, namely, when the output part 26 presents groups of sensors 21 on a system configuration diagram as markers that can distinguish the corresponding groups associated by hierarchical structures and the hierarchical structures, portions corresponding to the hierarchical structures of the markers may indicate the sequence of time points at which the abnormalities could have occurred. The output part 26 may present markers so that the groups that do not have a hierarchical structure can be distinguished from the groups that has a hierarchical structure.

FIG. 12 illustrates an example of an output result of the system analysis apparatus 100 according to the present exemplary embodiment. The analysis target system illustrated in FIG. 12 is a power plant system. In FIG. 12, the number immediately after each G in G1-1, G1-2, and G2 is the number added to the corresponding hierarchical group. The number after each hyphen (-) is the number added to the hierarchy level in the corresponding group. Presence or absence of a hyphen in an individual label indicates presence or absence of a hierarchical structure. The output part 26 may use a different representation method using colors, shapes, etc., other than character strings, as the representation method used to indicate presence or absence of a hierarchical structure. In FIG. 12, a label created by a combination of these two kinds of numbers is used as a marker that can distinguish a group and a hierarchical structure. The output part 26 may use a different representation method using colors, shapes, etc., other than character strings, as the representation method used to distinguish groups associated by a hierarchical structure and the hierarchical structure. The representation method of an individual group or hierarchical structure is not limited to the illustrated mode. In addition, the number of hierarchy levels is not limited to 2. A hierarchical structure having more hierarchy levels may be included.

The output part 26 may emphasize a part of groups associated by a hierarchical structure and a part of a hierarchical structure.

The output part 26 may present a part of groups associated by a hierarchical structure and a part of a hierarchical structure.

Alternatively, when presenting displayed groups associated by a hierarchical structure, the output part 26 may switch the displayed groups in accordance with the sequence of time points at which the abnormalities could have occurred. In this case, instead of completely switching the display, the output part 26 may switch the groups to be emphasized. In addition, the output part 26 may perform this switching automatically at predetermined time intervals. The output part 26 may repeat a series of display processing including this switching at a predetermined number of times or until receiving a user operation.

The output part 26 may display a part of groups associated by a hierarchical structure. In this case, instead of completely switching the display, the output part 26 may switch a group or groups to be emphasized.

Alternatively, when presenting groups associated by a hierarchical structure, the output part 26 may switch the displayed groups in accordance with the sequence of time points at which the abnormalities could have occurred. In this case, instead of completely switching the display, the output part 26 may switch the groups to be emphasized. The output part 26 may perform this switching based on a user operation or may automatically perform this switching at predetermined time intervals. The output part 26 may repeat a series of display processing including this switching at a predetermined number of times or until receiving a user operation.

Operation

Figure 13:
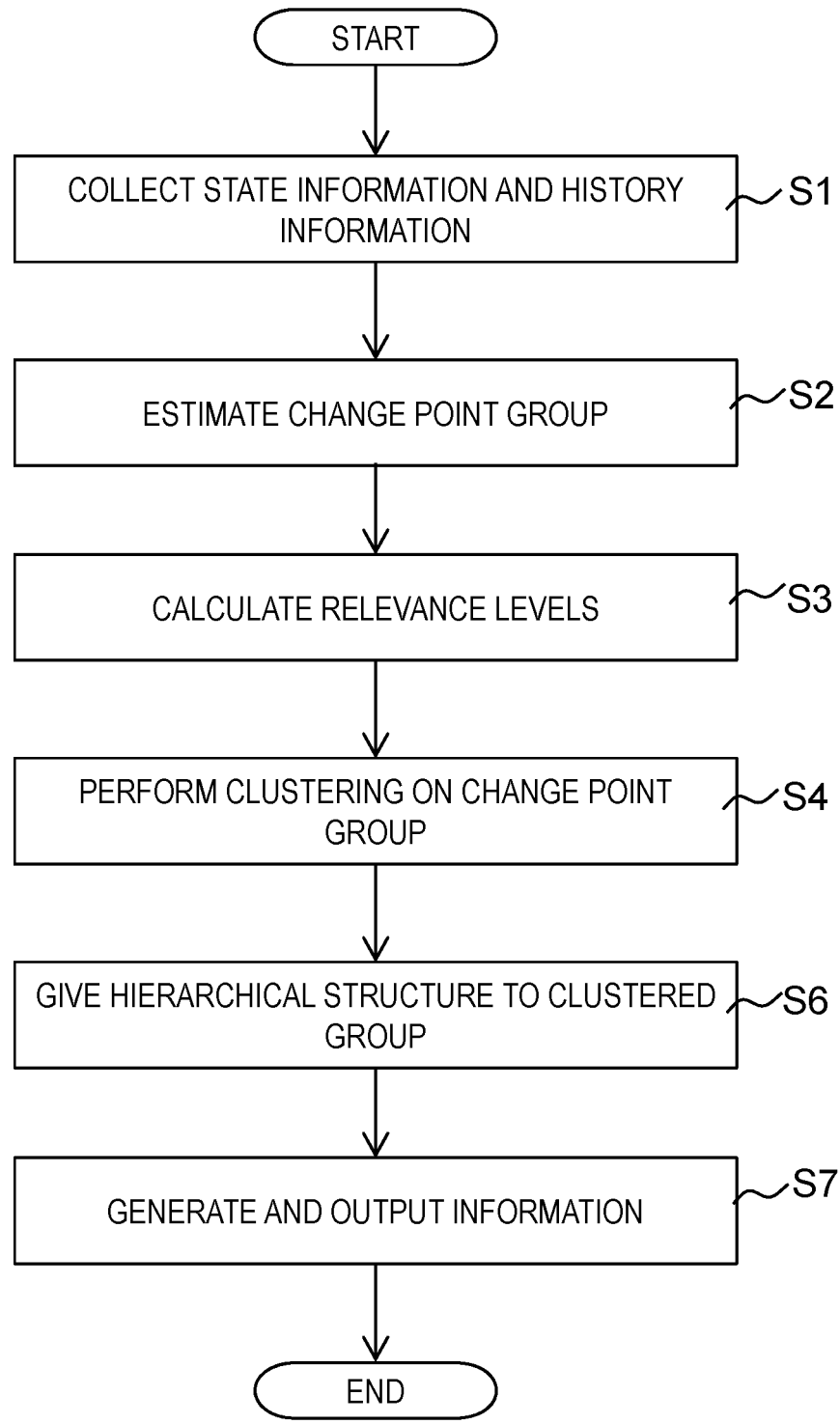
FIG. 13 is a flowchart illustrating an example of an operation of the system analysis apparatus according to the second exemplary embodiment.

Next, an operation of the system analysis apparatus 300 according to the present exemplary embodiment will be described with reference to FIG. 13. FIG. 13 is a flowchart illustrating an example of an operation of the system analysis apparatus 300 according to the present exemplary embodiment. The following description refers to FIG. 10 as needed. According to the present exemplary embodiment, a system analysis method is performed by operating the system analysis apparatus 300. Thus, the system analysis method according to the present exemplary embodiment will be described through the following operation of the system analysis apparatus 300.

As an example, the following description assumes that the relevance level estimation part 14 calculates the abnormality level of an individual sensor 21 per change point by using a correlation model, which has previously been acquired.

As illustrated in FIG. 13, the history information acquisition part 12 collects history information in a predetermined period from the analysis target system 200 (step S1). In parallel, the state information acquisition part 11 collects state information.

Next, the change point estimation part 13 estimates a change point group based on the history information acquired in step S1 (step S2). As an example, an individual change point has a corresponding time point and an identifier that refers to a corresponding data item or a relationship between data items.

Next, the relevance level estimation part 14 calculates inter-change-point relevance levels for the change point group estimated from the history information in step S2 (step S3). To calculate the relevance level between two arbitrary change points, the relevance level estimation part 14 calculates an abnormality level vector for each of these change points. The relevance level estimation part 14 calculates a similarity level between these abnormality level vectors and uses the similarity level as the relevance level between the change points.

Next, based on the history information collected in step S1 and the relevance levels estimated in step S3, the clustering part 15 classifies the change point group estimated in step S2 into at least one group by using the above clustering method and generates at least one change point group (step S4).

Next, the clustered hierarchy structuring part 17 uses the state information in the predetermined period acquired by the state information acquisition part 11 to estimate the individual causal relationship between sensors 21 and gives a hierarchical structure(s) to the groups generated in step S4 based on the individual causal relationship estimated (step S6).

Next, the output part 26 generates the above output information from the groups of sensors 21 obtained by the clustering in step S4 and the hierarchical structure(s) obtained in step S6 and outputs the output information (step S7).

In this way, the processing of the system analysis apparatus 300 is completed. After a predetermined period, when the analysis target system 200 outputs history information, the system analysis apparatus 300 performs steps S1 to S7, again.

Advantageous Effects

As described above, the system analysis apparatus 300 according to the present exemplary embodiment can provide the same advantageous effects as those provide by the system analysis apparatus 100 according to the first exemplary embodiment. In addition, according to the present exemplary embodiment, since a hierarchical structure is given to groups, even when events that have successively caused by an event caused by a single root cause are obtained as a plurality of groups, the causal relationship can be grasped as a hierarchical structure of groups. Thus, the operator can grasp the status of the analysis target system 200 more accurately.

Next, a variation of the present exemplary embodiment will be described. The following description will be made with a focus on the difference from the above first exemplary embodiment.

Variation 1

In variation 1, the clustered hierarchy structuring part 17 gives a hierarchical structure to only groups whose abnormality start time points are close to each other. In this way, since an individual hierarchical structure does not have branches, the complexity of the output result is reduced.

Program

A program according to the present exemplary embodiment causes a computer to perform steps S1 to S7 illustrated in FIG. 13. By installing this program in a computer and executing the program, the system analysis apparatus 300 and the display method according to the present exemplary embodiment can be realized. In this case, a CPU (central processing unit) of the computer performs processing while serving as the history information acquisition part 12, the change point estimation part 13, the relevance level estimation part 14, the clustering part 15, the clustered hierarchy structuring part 17, and the output part 26.

The program according to the present exemplary embodiment may be executed by a computer system established by a plurality of computers. In this case, for example, an individual computer may serve as any one of the history information acquisition part 12, the change point estimation part 13, the relevance level estimation part 14, the clustering part 15, the clustered hierarchy structuring part 17, and the output part 26.

In addition, the program according to the present exemplary embodiment is stored in a storage device of a computer that realizes the system analysis apparatus 300 and is read and executed by a CPU of the computer. In this case, the program may be provided as a computer-readable storage medium or provided via a network.

Exemplary Embodiment 3

Next, a system analysis method, a system analysis apparatus, and a program according to a third exemplary embodiment will be described with reference to FIG. 14.

Configuration

First, a configuration of the system analysis apparatus according to the third exemplary embodiment will be described with reference to FIG. 14. FIG. 14 is a block diagram illustrating a specific configuration of a system analysis apparatus 400 according to the present exemplary embodiment.

Figure 14:
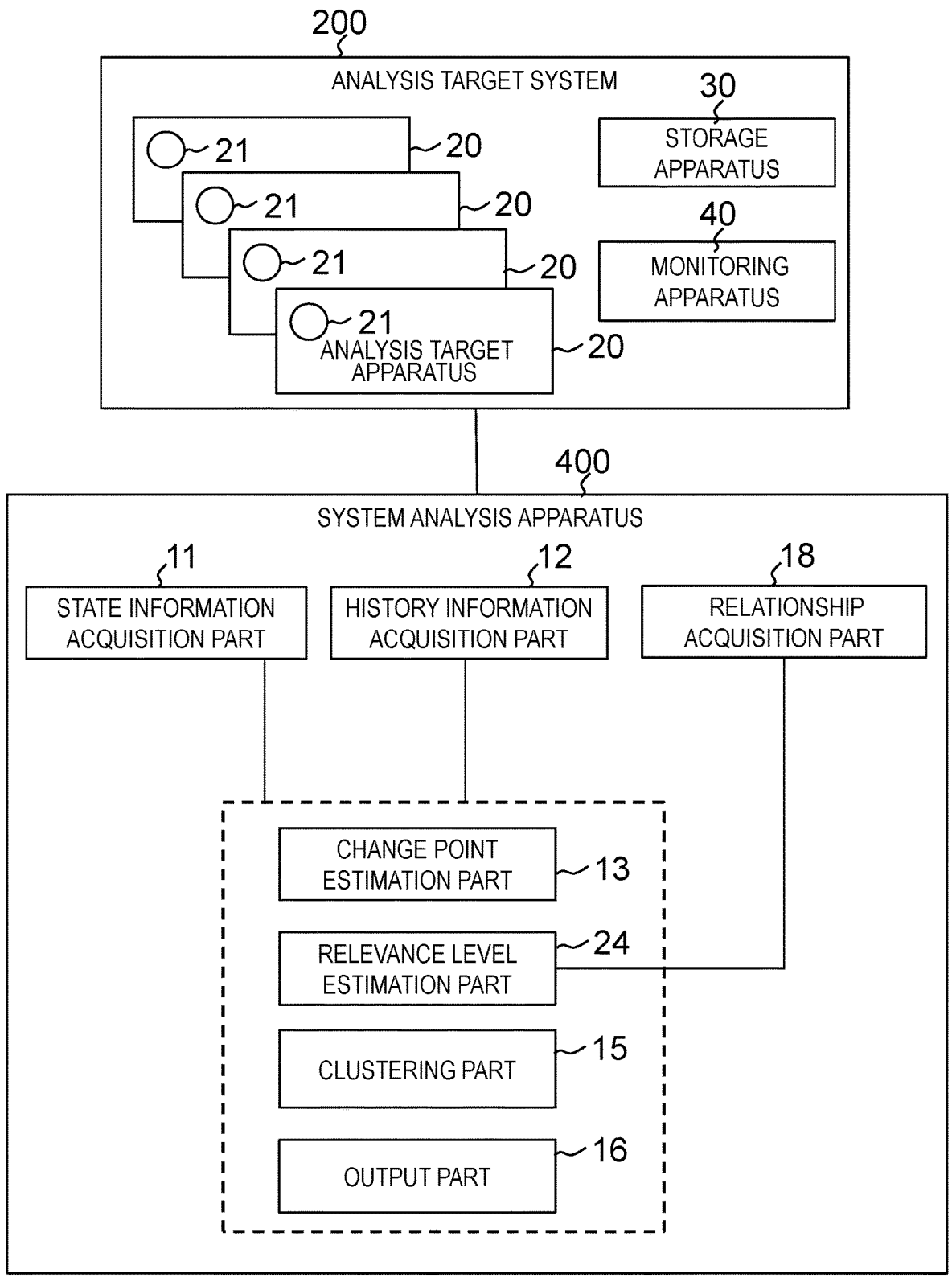
FIG. 14 is a block diagram illustrating an example of a specific configuration of a system analysis apparatus according to a third exemplary embodiment.

As illustrated in FIG. 14, the system analysis apparatus 400 according to the present exemplary embodiment differs from the system analysis apparatus 100 according to the first exemplary embodiment illustrated in FIGS. 2 and 3 in that the system analysis apparatus 400 includes a relationship acquisition part 18 and a relevance level estimation part 24 in place of the relevance level estimation part 14. In the other aspects, the system analysis apparatus 400 has the same configuration as that of the system analysis apparatus 100. Hereinafter, the present exemplary embodiment will be described with a focus on the difference from the first exemplary embodiment.

The relationship acquisition part 18 acquires relationship information between sensors 21. The relationship information is information that indicates the relationship between a plurality of sensors 21. The relationship information is provided regarding all of a plurality of data items that constitute the state information about an analysis target system 200 or some of the data items and is used for calculating the relevance level between change points. The relationship information is causal relationship information between a plurality of sensors 21 or information about the sequence in which the impacts of the abnormalities appear on a group of sensors 21 per abnormality. The relationship information includes at least one set of information indicating the sequence of a part of a group of sensors 21. For example, if sensor values indicate "the opening level of a value" and "the height of a liquid level", the relationship between the opening level of the value and the height of the liquid level is written as the relationship information. Alternatively, information about a sequence, such as information indicating that change of "the opening level of the valve" changes "the height of the liquid level", corresponds to the relationship information.

In addition, the causal relationship information between sensors 21 may be estimated from the time-series of the state information acquired by the state information acquisition part 11. Alternatively, the causal relationship information between sensors 21 may be estimated from external information that does not depend on the time-series of the state information. Still alternatively, the causal relationship information between sensors 21 may be estimated from the time-series of the state information and the external information that does not depend on the time-series of the state information.

For example, the method described in the second exemplary embodiment is used as the method for estimating the causal relationship information between sensors 21 from the time-series of the state information acquired by the state information acquisition part 11.

As the method for estimating the causal relationship information between sensors 21 from external information that does not depend on the time-series of the state information, for example, there is a method for estimating the causal relationship information from knowledge of experts, a connection relationship between analysis target apparatuses 20, a connection relationship between elements in analysis target apparatuses 20, or an equation relating to a system operation.

Examples of the method for estimating the causal relationship information between sensors 21 from the time-series of the state information and external information that does not depend on the time-series of the state information include the following methods. For example, there is a method for complementing a causal relationship between sensors 21, the causal relationship not being included in the causal relationship estimated from the time-series of the state information, with the causal relationship estimated from external information that does not depend on the time-series of the state information. There is also a method for extracting the causal relationship information included in both the causal relationship information estimated from the time-series of the state information and the causal relationship information estimated from external information that does not depend on the time-series of the state information.

The relevance level estimation part 24 estimates the relevance level between two arbitrary change points. When calculating the relevance level between change points, the relevance level estimation part 24 performs the same processing as that of the relevance level estimation part 14, except that the relevance level estimation part 24 uses the relationship information acquired by the relationship acquisition part 18.

A case in which the relevance level estimation part 24 calculates a relevance level by using the sequence in which the impacts of the abnormalities appear on a group of sensors 21 per abnormality as the relationship information will be described in detail, for example. The relevance level estimation part 24 arranges the sensors 21 included in a change point group in chronological order of the change points. The sequence of sensors 21 included in the relationship information that the above sequence matches best is searched for. Next, a high relevance level is assigned to change points for which the matching sequence of sensors 21 has been found, and a low relevance level is assigned to the other change points. The searching may be performed a plurality of times on the group of sensors 21 for which the matching sequence has not been found, and a high relevance level may be assigned to change points for which a corresponding sequence has been found. If a change point group includes change points relating to the relationship between data items, the relevance level may be calculated after the data items relating to the change points are estimated per change point. In one method for estimating the data items relating to the change points in the case as described above, the abnormality score in PTL 4 may be calculated, and a data item having an abnormality score higher than a predetermined value may be used as a data item relating to a change point.

Operation

Next, an operation of the system analysis apparatus 400 according to the present exemplary embodiment will be described. The operation of the system analysis apparatus 400 according to the present exemplary embodiment is the same as that of the system analysis apparatus 100 according to the first exemplary embodiment, except that the relationship acquisition part 18 acquires relationship information from the outside before step S3 and that the relevance level estimation part 24 calculates the relevance level between change points based on the relationship information.

Advantageous Effects

As described above, the system analysis apparatus 400 according to the present exemplary embodiment can provide the same advantageous effects as those provided by the system analysis apparatus 100 according to the first exemplary embodiment. In addition, knowledge necessary to calculate the relevance level between change points can be given from the outside. As a result, since a change point group can be classified into groups more accurately, the operator can grasp the status of the analysis target system 200 more accurately.

Program

A program according to the present exemplary embodiment causes a computer to perform the processing described in the section [Operation]. By installing this program in a computer and executing the program, the system analysis apparatus 400 and the system analysis method according to the present exemplary embodiment can be realized. In this case, a CPU (central processing unit) of the computer performs the processing while serving as the history information acquisition part 12, the change point estimation part 13, the relevance level estimation part 24, the relationship acquisition part 18, the clustering part 15, and the output part 16.

The program according to the present exemplary embodiment may be executed by a computer system established by a plurality of computers. In this case, for example, the individual computers may be configured to serve as the history information acquisition part 12, the change point estimation part 13, the relevance level estimation part 24, the relationship acquisition part 18, the clustering part 15, and the output part 16.

In addition, the program according to the present exemplary embodiment is stored in a storage device of a computer that realizes the system analysis apparatus 400 and is read and executed by a CPU of the computer. In this case, the program may be provided as a computer-readable storage medium or provided via a network.

Exemplary Embodiment 4

Next, a system analysis apparatus, a system analysis method, and a program according to a fourth exemplary embodiment will be described with reference to FIG. 15.

Configuration

First, a configuration of the system analysis apparatus according to the fourth exemplary embodiment will be described with reference to FIG. 15. FIG. 15 is a block diagram illustrating an example of a specific configuration of a system analysis apparatus 500 according to the present exemplary embodiment.

Figure 15:
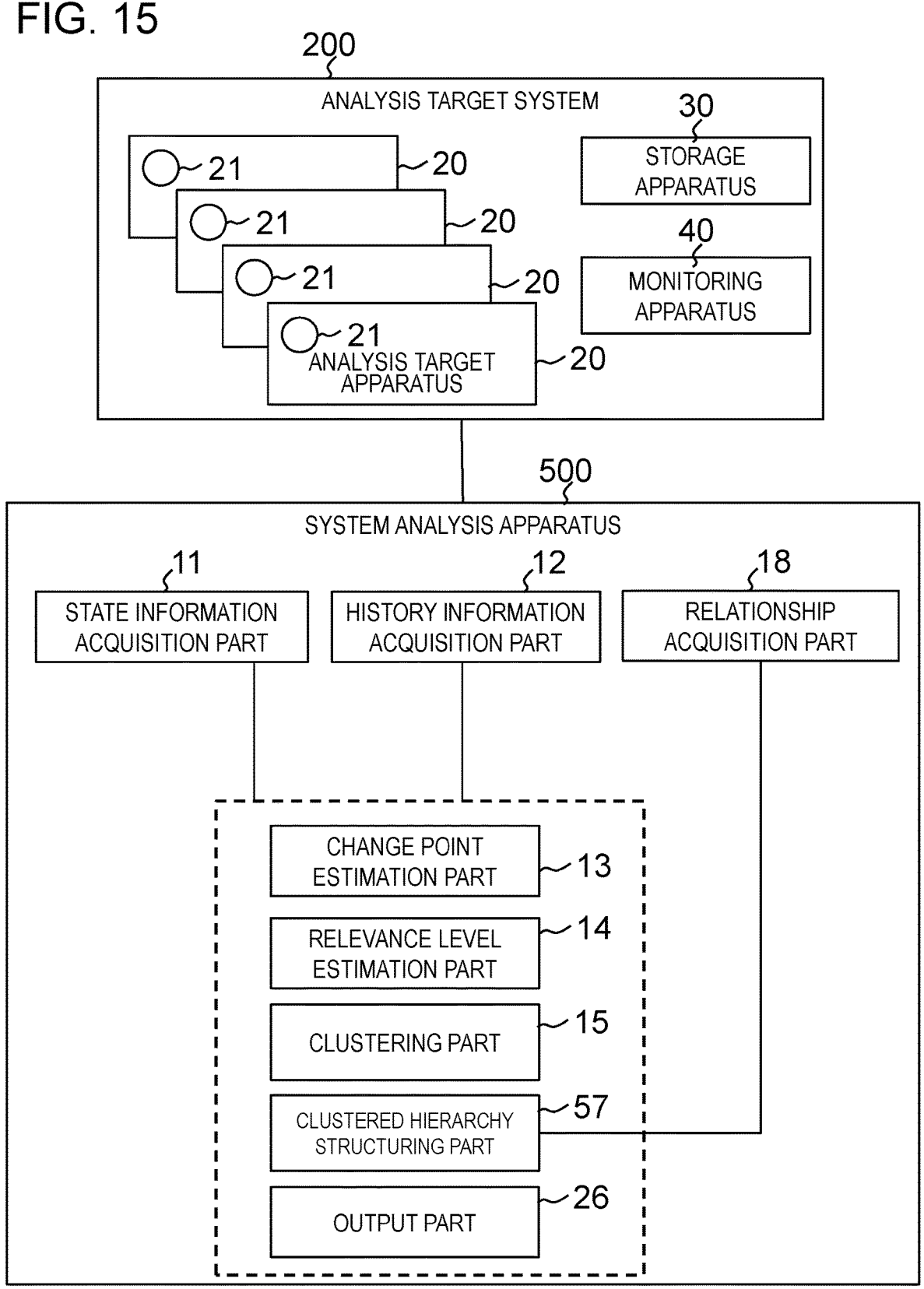
FIG. 15 is a block diagram illustrating an example of a specific configuration of a system analysis apparatus according to a fourth exemplary embodiment.

As illustrated in FIG. 15, the system analysis apparatus 500 according to the present exemplary embodiment differs from the system analysis apparatus 300 according to the second exemplary embodiment illustrated in FIG. 10 in that the system analysis apparatus 500 includes a relationship acquisition part 18 and a clustered hierarchy structuring part 57 in place of the clustered hierarchy structuring part 17. In the other aspects, the system analysis apparatus 500 has the same configuration as that of the system analysis apparatus 300. Hereinafter, the present exemplary embodiment will be described with a focus on the difference from the second exemplary embodiment.

The relationship acquisition part 18 acquires the relationship information between sensors 21. The relationship acquisition part 18 has the same function as that according to the third exemplary embodiment.

The clustered hierarchy structuring part 57 gives a hierarchical structure to at least one change point group generated by the clustering part 15, based on the relationship information acquired by the relationship acquisition part 18.

When it is estimated that there is a relationship between groups, the clustered hierarchy structuring part 57 gives a hierarchical structure to the groups based on the direction of the relationship. In contrast, the clustered hierarchy structuring part 57 does not give a hierarchical structure to groups for which no relationship is recognized.

For example, a case in which the clustered hierarchy structuring part 57 gives a hierarchical structure to at least one change point group by using the sequence in which the impacts of the abnormalities appear on a group of sensors 21 per abnormality as the relationship information will be described in detail.

The clustered hierarchy structuring part 57 arranges change point groups chronologically based on the earliest time point of a change point included in an individual change point group. The clustered hierarchy structuring part 57 searches for the sequence that best matches the sequence of the relationship information when a data item corresponding to a change point is extracted from an individual change point group while changing the data item extracted. Next, the clustered hierarchy structuring part 57 gives a hierarchical structure to the matching change point groups in accordance with the sequence. The clustered hierarchy structuring part 57 may perform the searching a plurality of times on the change point groups to which a hierarchical structure has not been given. In this case, the clustered hierarchy structuring part 57 may give a hierarchical structure to change point groups for which a corresponding sequence has been found. The data items extracted from the change point groups may be a part of the data items corresponding to the change points included in the change point groups. For example, when the abnormality level of a sensor is calculated per change point group, a data item corresponding to a sensor whose abnormality level is higher than a predetermined value may be used. For example, when a change point group includes change points relating to an inter-data-item relationship, the abnormality scores in PTL 4 may be calculated, and a data item whose abnormality score is higher than a predetermined value may be used as a data item relating to the change point group.

Operation

Next, an operation of the system analysis apparatus 500 according to the present exemplary embodiment will be described. The operation of the system analysis apparatus 500 according to the present exemplary embodiment is the same as that of the system analysis apparatus 300 according to the second exemplary embodiment, except that the relationship acquisition part 18 acquires relationship information from the outside before step S6 and that the relevance level estimation part 24 calculates the relevance level between change points based on the relationship information.

Advantageous Effects

As described above, the system analysis apparatus 500 according to the present exemplary embodiment can provide the same advantageous effects as those of the system analysis apparatus 300 according to the second exemplary embodiment. In addition, necessary knowledge can be given from the outside when the clustered hierarchy structuring part 57 gives a hierarchical structure to at least one change point group. As a result, since a hierarchical structure can be given to at least one change point group more accurately, the operator can grasp the status of the analysis target system 200 more accurately.

Program

A program according to the present exemplary embodiment causes a computer to perform the processing described in the section [Operation]. By installing this program in a computer and executing the program, the system analysis apparatus 500 and the system analysis method according to the present exemplary embodiment can be realized. In this case, a CPU (central processing unit) of the computer performs the processing while serving as the history information acquisition part 12, the change point estimation part 13, the relevance level estimation part 14, the clustering part 15, the relationship acquisition part 18, the clustered hierarchy structuring part 57, and the output part 16.

The program according to the present exemplary embodiment may be executed by a computer system established by a plurality of computers. In this case, for example, an individual computer may be configured to serve as any one of the history information acquisition part 12, the change point estimation part 13, the relevance level estimation part 14, the clustering part 15, the relationship acquisition part 18, and the output part 16.

In addition, the program according to the present exemplary embodiment is stored in a storage device of a computer that realizes the system analysis apparatus 500 and is read and executed by a CPU of the computer. In this case, the program may be provided as a computer-readable storage medium or provided via a network.

While the first to fourth exemplary embodiments described above have been described assuming that the analysis target system 200 is a power plant system, the analysis target system 200 is not limited to any particular system in the disclosure of the present application. Examples of the analysis target system 200 includes an information technology (IT) system, a plant system, a structure, and a transport apparatus. In any of these cases, the system analysis apparatus can use data items included in information indicating the state of the analysis target system as sensors and generate output information by using the corresponding history information.

The above first to fourth exemplary embodiments have been described mainly assuming that the individual functional blocks of the corresponding system analysis apparatus are realized by a CPU that executes a computer program stored in a storage device or a read-only memory (ROM). However, the disclosure of the present application is not limited to this example. In the disclosure of the present application, all the functional blocks of the system analysis apparatus may be realized by dedicated hardware. Alternatively, a part of the functional blocks may be realized by hardware, and the rest of the functional blocks may be realized by software.

In addition, in the disclosure of the present application, the above first to fourth exemplary embodiments may be combined as appropriate. In addition, the disclosure of the present application is not limited to the above exemplary embodiments. The disclosure of the present application can be implemented in various modes. For example, the system analysis apparatus according to any one of the first to fourth exemplary embodiments may include an analysis model acquisition part that generates history information, an analysis part, and an abnormality detection part that detects occurrence of abnormalities. Namely, the system analysis apparatus according to any one of the first to fourth exemplary embodiments may include the function of the monitoring apparatus 40.

Physical Configuration

Figure 16:
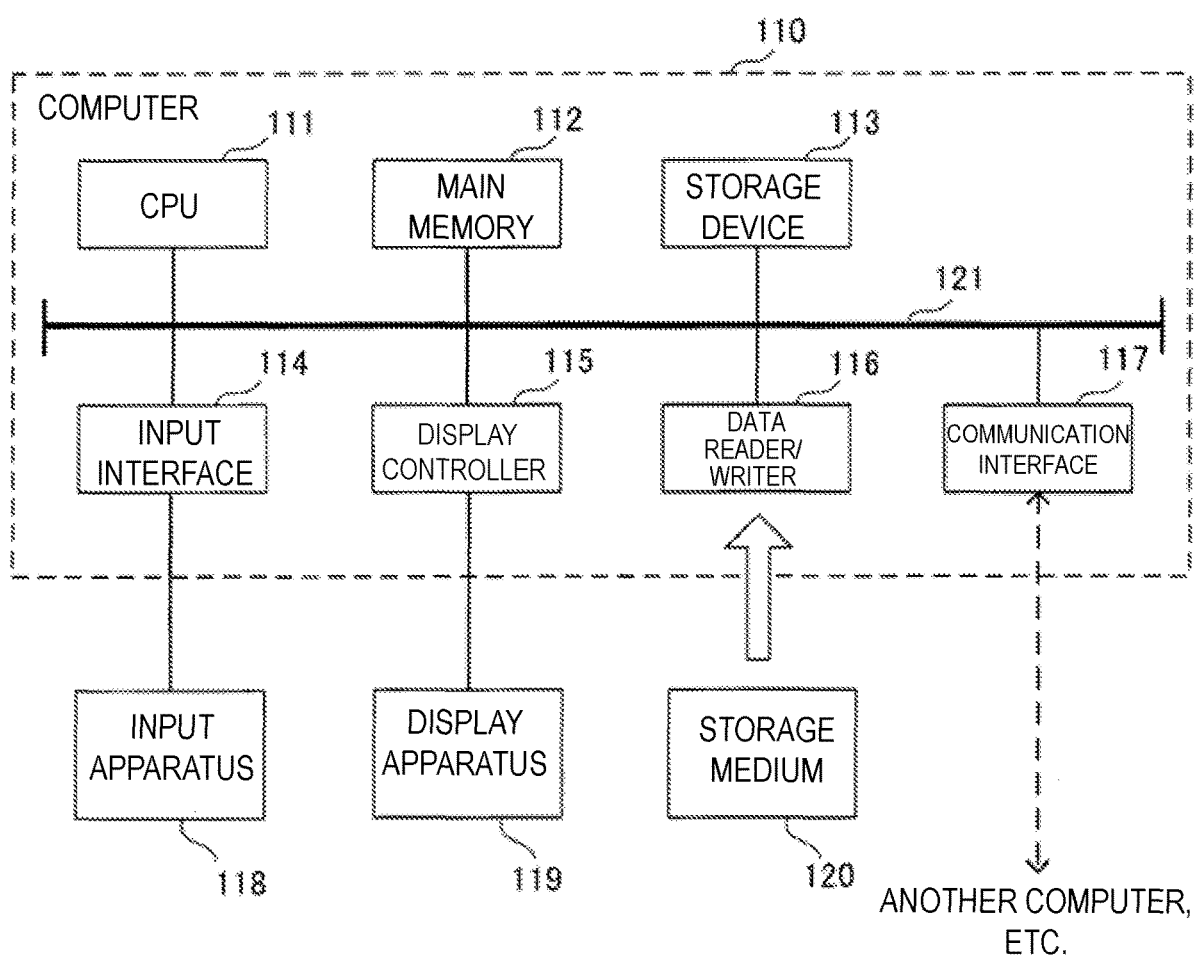
FIG. 16 is a block diagram illustrating an example of a configuration of a computer that realizes the system analysis apparatus according to any one of the first to fourth exemplary embodiments.

Next, a computer that realizes any one of the system analysis apparatuses by executing a program according to the corresponding one of the first to fourth exemplary embodiments will be described with reference to FIG. 16. FIG. 16 is a block diagram illustrating an example of a computer that realizes the system analysis apparatus according to any one of the first to fourth exemplary embodiments.

As illustrated in FIG. 16, a computer 110 includes a central processing unit (CPU) 111, a man memory 112, a storage device 113, an input interface 114, a display controller 115, a data reader/writer 116, and a communication interface 117. These parts are connected to each other to enable mutual data communication via a bus 121.

The CPU 111 loads a program (code) according to any one of the first to fourth exemplary embodiments stored in the storage device 113 to the man memory 112, executes the program (code) in a predetermined sequence, and performs various kinds of calculation. The man memory 112 is typically a volatile storage device such as a dynamic random-access memory (DRAM). In addition, the program according to any one of the first to fourth exemplary embodiments is stored and provided in a computer-readable storage medium 120. The program according to the present exemplary embodiment may be distributed on the connected Internet via the communication interface 117.

In addition, other than a hard disk drive (HDD), specific examples of the storage device 113 include a semiconductor storage device such as a flash memory. The input interface 114 mediates data transfer between the CPU 111 and an input apparatus 118 such as a keyboard or a mouse. The display controller 115 is connected to a display apparatus 119 and controls the display on the display apparatus 119.

The data reader/writer 116 mediates data transfer between the CPU 111 and the storage medium 120, reads a program from the storage medium 120, and writes a processing result of the computer 110 to the storage medium 120. The communication interface 117 mediates data transfer between the CPU 111 and another computer.

Specific examples of the storage medium 120 include a general semiconductor storage device such as a compact flash (registered trademark) (CF) and a secure digital (SD), a magnetic storage medium such as a flexible disk, and an optical storage medium such as a compact disk read-only memory (CD-ROM).

As described above, according to the above exemplary embodiments, when a plurality of kinds of abnormalities occur in an analysis target system, the abnormalities can be separated from each other depending on the kinds, and information can be outputted per kind. The disclosure of the present application can suitably be applied to diagnosis of system abnormalities, for example.

[Note 1]

See the system analysis method according to the above first aspect.

[Note 2]

The system analysis method preferably according to note 1, further including giving a hierarchical structure to the groups of change point groups based on relationship information indicating an inter-sensor relationship(s).

[Note 3]

The system analysis method preferably according to note 2, further including acquiring the relationship information.

[Note 4]

The system analysis method preferably according to note 3; wherein, in estimating the relevance levels, the relevance levels are estimated by using the relationship information.

[Note 5]

The system analysis method preferably according to any one of notes 1 to 4; wherein, in estimating the change point group, time points, each of which corresponds to occurrence of an abnormality that continuously appears, in the history information are estimated as the change points.

[Note 6]

The system analysis method preferably according to any one of notes 1 to 5; wherein in estimating the relevance levels, an abnormality level of an individual sensor at a corresponding change point included in the change point group is calculated, an abnormality level vector using the calculated abnormality level as an element is generated per change point, and a similarity level between abnormality level vectors, each of which has been generated per change point, is used as an individual relevance level.

[Note 7]

The system analysis method preferably according to any one of notes 1 to 6; wherein, in generating the groups of change point groups, a distance between change points included in the change point group is calculated based on the history information and the corresponding relevance level, and an individual group of change point groups is generated based on the calculated distance between change points.

[Note 8]

The system analysis method preferably according to note 7; wherein, in generating the groups of change point groups, a product of a non-relevance level calculated from the corresponding relevance level and a temporal distance between the change points is calculated as the distance between change points.

[Note 9]

The system analysis method preferably according to note 2; wherein, in giving a hierarchical structure to the groups of change point groups, a causal relationship between different sensors is estimated, and based on the estimated causal relationship between different sensors, presence or absence of a causal relationship between the corresponding change point groups is estimated; and wherein, if there is a causal relationship between the corresponding change point groups, a hierarchical structure is given to the corresponding groups of change point groups.

[Note 10]

The system analysis method preferably according to note 9; wherein, in giving a hierarchical structure to the groups of change point groups, a hierarchical structure based on a causal direction is given to the change point groups having the causal relationship.

[Note 11]

See the system analysis apparatus according to the above second aspect.

[Note 12]

The system analysis apparatus preferably according to note 11, further comprising a clustered hierarchy structuring part that gives a hierarchical structure to the groups of change point groups based on relationship information indicating an inter-sensor relationship(s).

[Note 13]

The system analysis apparatus preferably according to note 12, further including a relationship acquisition part that acquires the relationship information.

[Note 14]

The system analysis apparatus preferably according to note 13; wherein the relevance level estimation part estimates the relevance levels by using the relationship information.

[Note 15]

See the program according to the above third aspect.

All the disclosed contents of the above PTLs are incorporated herein by reference thereto. Variations and adjustments of the exemplary embodiments are possible within the scope of the overall disclosure (including the claims) of the present invention and based on the basic technical concept of the present invention. Various combinations and selections of various disclosed elements (including the elements in each of the claims, exemplary embodiments, drawings, etc.) are possible within the scope of the overall disclosure of the present invention. Namely, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed.

REFERENCE SIGNS LIST 10, 100, 300, 400, 500 system analysis apparatus
11 state information acquisition part
12 history information acquisition part
13 change point estimation part
14, 24 relevance level estimation part
15 clustering part
16, 26 output part
17, 57 clustered hierarchy structuring part
18 relationship acquisition part
20 analysis target apparatus
21 sensor
30 storage apparatus
40 monitoring apparatus
110 computer
111 CPU (central processing unit)
112 main memory
113 storage device
114 input interface
115 display controller
116 data reader/writer
117 communication interface
118 input apparatus
119 display apparatus
120 storage medium
121 bus
200 analysis target system

What is claimed is:

1. A system analysis method, comprising:
   (a) acquiring time-series information of sensor values outputted by a plurality of sensors arranged in a system, wherein the sensor values indicate an individual one of the sensor values outputted by the respective sensors indicates an abnormality and/or whether an individual relationship between sensor values outputted by different sensors indicates an abnormality;
   (b) estimating a change point group of change points in the time-series information, wherein each of the change points indicates a time point at which state of the system has changed;
   (c) estimating an abnormality level for each change points included in the change point group and a similarity level between abnormality level vectors of two arbitrary time points included in the change point group, wherein the abnormality level vector is composed of abnormality levels;
   (d) generating groups of change point groups by classifying the change point group into a plurality of groups based on the time-series information and the similarity level between abnormality level vectors; and
   (e) generating and outputting output information, which is information relating to an abnormality per group of the change point groups.

2. The system analysis method according to claim 1, further comprising:
   (f) giving a hierarchical structure to the groups of change point groups based on relationship information indicating an inter-sensor relationship(s).

3. The system analysis method according to claim 2, further comprising:
   (g) acquiring the relationship information.

4. The system analysis method according to claim 3; wherein, in operation (c), the abnormality level is estimated by using the relationship information.

5. The system analysis method according to claim 1; wherein, in operation (b), time points, each of which corresponds to occurrence of an abnormality that continuously appears, in the time-series information are estimated as the change points.

6. The system analysis method according claim 1; wherein, in operation (d), a distance between change points included in the change point group is calculated based on the time-series information and the corresponding relevance level, and an individual group of change point groups is generated based on the calculated distance between change points.

7. The system analysis method according to claim 6; wherein, in operation (d), a product of a non-relevance level calculated from the corresponding relevance level and a temporal distance between the change points is calculated as the distance between change points.

8. The system analysis method according to claim 2; wherein, in operation (f), a causal relationship between different sensors is estimated, and based on the estimated causal relationship between different sensors, presence or absence of a causal relationship between the corresponding change point groups is estimated; and wherein, if there is a causal relationship between the corresponding change point groups, a hierarchical structure is given to the corresponding groups of change point groups.

9. The system analysis method according to claim 8; wherein, in operation (f), a hierarchical structure based on a causal direction is given to the change point groups having the causal relationship.

10. The system analysis method according to claim 1, further comprising:
generating the output information including at least one of a list of names of sensor groups relating to abnormalities, time periods at which the abnormalities have started to occur, sensor information relating to the abnormalities visualized on a system configuration diagram, or information on similar past problems.

11. A system analysis apparatus, comprising:
at least a processor; and
a memory in circuit communication with the processor,
wherein the processor is configured to execute program instructions stored in the memory to implement:
a time-series information acquisition part that acquires time-series information of sensor values outputted by a plurality of sensors arranged in a system, wherein the sensor values indicate an individual one of the sensor values outputted by the respective sensors indicates an abnormality and/or whether an individual relationship between sensor values outputted by different sensors indicates an abnormality;
a change point estimation part that estimates a change point group of change points in the time-series information, wherein the each of change points indicates a time point at which state of the system has changed;
a relevance level estimation part that estimates an abnormality level for each change points included in the change point group and a similarity level between abnormality level vectors of two arbitrary time points included in the change point group, wherein the abnormality level vector is composed of abnormality levels;
a clustering part that generates groups of change point groups by classifying the change point group into a plurality of groups based on the time-series information and the similarity level between abnormality level vectors; and
an output part that generates and outputs output information, which is information relating to an abnormality per group of the change point groups.

12. The system analysis apparatus according to claim 11, further comprising a clustered hierarchy structuring part that gives a hierarchical structure to the groups of change point groups based on relationship information indicating an inter-sensor relationship(s).

13. The system analysis apparatus according to claim 12, further comprising a relationship acquisition part that acquires the relationship information.

14. The system analysis apparatus according to claim 13; wherein the relevance level estimation part estimates the abnormality level by using the relationship information.

15. A non-transient computer-readable storage medium stored a program, causing a computer to execute:
(a) acquiring time-series information of sensor values outputted by a plurality of sensors arranged in a system, wherein the sensor values indicate an individual one of the sensor values outputted by the respective sensors indicates an abnormality and/or whether an individual relationship between sensor values outputted by different sensors indicates an abnormality;
(b) estimating a change point group of change points in the time-series information, wherein the each of change points indicates a time point at which state of the system has changed;
(c) estimating an abnormality level for each change points included in the change point group and a similarity level between abnormality level vectors of two arbitrary time points included in the change point group, wherein the abnormality level vector is composed of abnormality levels;
(d) generating groups of change point groups by classifying the change point group into a plurality of groups based on the time-series information and the abnormality level; and
(e) generating and outputting output information, which is information relating to an abnormality per group of the change point groups.

16. The non-transient computer-readable storage medium stored the program according to claim 15; wherein, in operation (b), time points, each of which corresponds to occurrence of an abnormality that continuously appears, in the time-series information are estimated as the change points.

17. The non-transient computer-readable storage medium stored the program according claim 15; wherein in operation (c), an abnormality level of an individual sensor at a corresponding change point included in the change point group is calculated, an abnormality level vector using the calculated abnormality level as an element is generated per change point, and a similarity level between abnormality level vectors, each of which has been generated per change point, is used as an individual relevance level.

18. The non-transient computer-readable storage medium stored the program according claim 15; wherein, in operation (d), a distance between change points included in the change point group is calculated based on the time-series information and the corresponding relevance level, and an individual group of change point groups is generated based on the calculated distance between change points.

19. The non-transient computer-readable storage medium stored the program according to claim 15, further comprising:
(f) giving a hierarchical structure to the groups of change point groups based on relationship information indicating an inter-sensor relationship(s).

20. The non-transient computer-readable storage medium stored the program according to claim 19;
wherein, in operation (f), a causal relationship between different sensors is estimated, and based on the estimated causal relationship between different sensors, presence or absence of a causal relationship between the corresponding change point groups is estimated; and
wherein, if there is a causal relationship between the corresponding change point groups, a hierarchical structure is given to the corresponding groups of change point groups.

* * * * *